US012389498B2

(12) United States Patent
Kikuchi

(10) Patent No.: US 12,389,498 B2
(45) Date of Patent: Aug. 12, 2025

(54) COOKING DEVICE AND COOKING SYSTEM

(71) Applicant: PRODUCE ON DEMAND, INC., Tokyo (JP)

(72) Inventor: Yosuga Kikuchi, Tokyo (JP)

(73) Assignee: PRODUCE ON DEMAND, INC., Tokyo (JP)

( * ) Notice: Subject to any disclaimer, the term of this patent is extended or adjusted under 35 U.S.C. 154(b) by 907 days.

(21) Appl. No.: 17/606,007

(22) PCT Filed: Jul. 30, 2019

(86) PCT No.: PCT/JP2019/029902
§ 371 (c)(1),
(2) Date: Oct. 22, 2021

(87) PCT Pub. No.: WO2020/217555
PCT Pub. Date: Oct. 29, 2020

(65) Prior Publication Data

US 2022/0210874 A1 Jun. 30, 2022

(30) Foreign Application Priority Data

Apr. 26, 2019 (JP) ................................ 2019-086496

(51) Int. Cl.
*H05B 6/06* (2006.01)

(52) U.S. Cl.
CPC ......... *H05B 6/062* (2013.01); *H05B 2213/07* (2013.01)

(58) Field of Classification Search
CPC ........ F24C 7/083; F24C 7/087; H05B 1/0266; H05B 2213/07; H05B 3/68; H05B 6/062
(Continued)

(56) References Cited

U.S. PATENT DOCUMENTS

2013/0112683 A1* 5/2013 Hegedis ................ A47J 36/321 219/660
2016/0088685 A1* 3/2016 Henke .................... H05B 6/062 99/332
(Continued)

FOREIGN PATENT DOCUMENTS

CN 205883618 U 1/2017
JP H06-317328 A 11/1994
(Continued)

OTHER PUBLICATIONS

Japanese Patent Office, International Search Report, Application No. PCT/JP2019/029902, dated Oct. 21, 2019, in 5 pages.
(Continued)

*Primary Examiner* — Ibrahime A Abraham
*Assistant Examiner* — Joseph W Iskra
(74) *Attorney, Agent, or Firm* — PROCOPIO, CORY, HARGREAVES & SAVITCH LLP

(57) ABSTRACT

The present invention makes it possible to easily cook a desired dish by properly controlling heating temperatures of objects to be heated in cookware in accordance with a cooking procedure. The cooking device 10 is provided with: a heating unit 11 for heating cookware C containing objects to be heated such as water, oil, and ingredients; a temperature detection unit 12 for detecting a temperature of the objects to be heated and/or a temperature of a bottom exterior surface of the cookware C; and a control unit 18 for controlling the heating unit 11 on the basis of the temperature detected by the temperature detection unit 12 such that the temperature of the objects to be heated in the cookware C or a surface temperature of a bottom interior surface of the cookware C matches a cooking temperature set in a cooking process included in cooking execution information.

4 Claims, 8 Drawing Sheets

(58) Field of Classification Search
USPC .......................................................... 219/627
See application file for complete search history.

(56) References Cited

U.S. PATENT DOCUMENTS

| | | | | |
|---|---|---|---|---|
| 2017/0067648 | A1* | 3/2017 | Norman ................. | H05B 6/062 |
| 2017/0339751 | A1* | 11/2017 | Meng ..................... | G01K 1/143 |

FOREIGN PATENT DOCUMENTS

| | | | |
|---|---|---|---|
| JP | 2005-011670 | A | 1/2005 |
| JP | 2011-071040 | A | 4/2011 |
| JP | 2011-253781 | A | 12/2011 |
| JP | 2017-020703 | A | 1/2017 |

OTHER PUBLICATIONS

PCT/ISA/237, Application No. PCT/JP2019/029902, dated Oct. 21, 2019, in 5 pages.
European Patent Office, Extended European Search Report 19926102.5, Application No. PCT/JP2019/029902, dated Jan. 2, 2023, in 14 pages.

* cited by examiner

COOKING DEVICE AND COOKING SYSTEM

CROSS-REFERENCE TO RELATED APPLICATIONS

This application is US National Stage of International Patent Application PCT/JP2019/029902, filed Jul. 30, 2019 which claims benefit of priority from Japanese Patent Application JP2019-086496, filed Apr. 26, 2019, the contents of both of which are incorporated herein by reference.

TECHNICAL FIELD

The present invention relates to a cooking device and a cooking system.

BACKGROUND ART

For example, the following Patent Literature 1 discloses an induction heating type cooker in which cookware such as a pot or a frying pan disposed above an induction heating coil is heated by magnetic force lines generated by a current flowing through the induction heating coil.

In a general induction heating type cooker including a device according to Patent Literature 1, for example, a thermal power level is set in stages such as "weak fire, middle fire, strong fire" or "level 1 to level 5", and a user cooks while adjusting thermal power each time during cooking.

CITATION LIST

Patent Literature

Patent Literature 1: JP-A-2005-11670

SUMMARY OF INVENTION

Technical Problem

While cooking, it is very important to manage a temperature of an object to be heated (a liquid such as water or oil, ingredients, or the like) in the cookware. In order to show a technique that a cook has cultivated for many years, it is necessary to control the temperature of the object to be heated in units of 1° C. In addition, a development of cooking science over the past few decades has been remarkable, and many studies on cooking have revealed that a minute difference in heating temperature with respect to the object to be heated has a great influence on taste, texture, nutritional value and the like.

However, in the general induction heating type cooker such as the device according to Patent Literature 1, it is necessary to perform cooking by adjusting the thermal power, and it is very difficult to perform fine temperature management in units of 1° C. This is not limited to the induction heating type cooker, and the same applies to a case where a gas cooker is used.

For this reason, it is desired to develop a cooking device that allows anyone to easily perform strict temperature management on an object to be heated in cookware.

The present invention has been made in view of the above circumstances, and an object of the present invention is to provide a cooking device and a cooking system that can easily cook a desired dish by controlling an object to be heated in cookware to an appropriate temperature according to a cooking content.

Solution to Problem

In order to solve the above-described problems, a cooking device according to the present invention includes: a heating unit configured to heat cookware containing an object to be heated; a temperature detection unit configured to detect at least one of a temperature of the object to be heated and a temperature of an outer surface of a bottom portion of the cookware; and a control unit configured to control the heating unit based on the temperature detected by the temperature detection unit such that a surface temperature of the object to be heated in the cookware or an inner surface of the bottom portion of the cookware matches a cooking temperature set in a cooking process included in cooking execution information.

Preferably, in the cooking device, the temperature detection unit includes at least one of a body temperature detection unit configured to detect the temperature of the outer surface of the bottom portion of the cookware serving as a temperature detection target and an external temperature detection unit configured to directly detect the temperature of the object to be heated contained in the cookware serving as a temperature detection target.

Preferably, in the cooking device, the control unit includes a cooking execution unit configured to execute the cooking process according to a cooking procedure set in advance while controlling the heating unit such that the temperature of the object to be heated in the cookware set as a temperature control target or the surface temperature of the inner surface of the bottom portion of the cookware matches the cooking temperature, and a profile preparation unit configured to prepare a cookware profile for predicting the temperature of the object to be heated by correcting the temperature of the outer surface of the bottom portion of the cookware detected by the body temperature detection unit according to specifications of the cookware, the cookware profile including time-lapse temperature difference information indicating a dynamic relationship of a temperature difference for each elapsed time between the temperature of the outer surface of the bottom portion of the cookware detected by the body temperature detection unit and the temperature of the object to be heated detected by the external temperature detection unit when the cookware is heated in a state where the object to be heated is contained in the cookware. The cooking execution unit predicts the temperature of the temperature control target by correcting the temperature of the outer surface of the bottom portion detected by the body temperature detection unit using the cookware profile of the cookware in use, and controls the heating unit such that the predicted temperature matches the cooking temperature.

Preferably, the cooking device further includes: an environmental information obtainment unit including an outside air temperature detection unit that detects an outside air temperature of a kitchen and an atmospheric pressure detection unit that detects an atmospheric pressure of the kitchen, and configured to obtain the outside air temperature and the atmospheric pressure as environmental information of the kitchen. The control unit controls an output of the heating unit in the cooking process in consideration of the obtained environmental information when the cooking execution information is executed.

A cooking system according to the present invention includes: any above cooking device; and a mobile terminal registered as an owner of the cooking device, wherein the cooking device and the mobile terminal being connected to each other so as to enable bidirectional communication. The mobile terminal includes a terminal control unit that outputs an initialization execution instruction for causing the cooking device to execute initialization processing. The cooking device executes the initialization processing by the control unit only when the initialization execution instruction is received from the mobile terminal.

Advantageous Effects of Invention

According to the present invention, it is possible to easily cook a desired dish by controlling an object to be heated in cookware to an appropriate temperature according to a cooking content.

DESCRIPTION OF EMBODIMENT

Hereinafter, an embodiment of the present invention will be described in detail with reference to the accompanying drawings. The present invention is not limited by the embodiment, and all other feasible embodiments, examples, operational techniques and the like that can be conceived by those skilled in the art based on the embodiment are all included in the scope of the present invention.

In the following description, terms representing directions (for example, “upper”, “lower”, “right”, “left”, “front”, “rear” and the like) are used as appropriate in order to facilitate understanding. However, this is for illustration purposes only and these terms are not intended to limit the present invention. The terms indicating these directions mean directions when a cooking device 10 disposed to face a user is viewed from a front side, unless otherwise specified.

[System Configuration]

Figure 1:
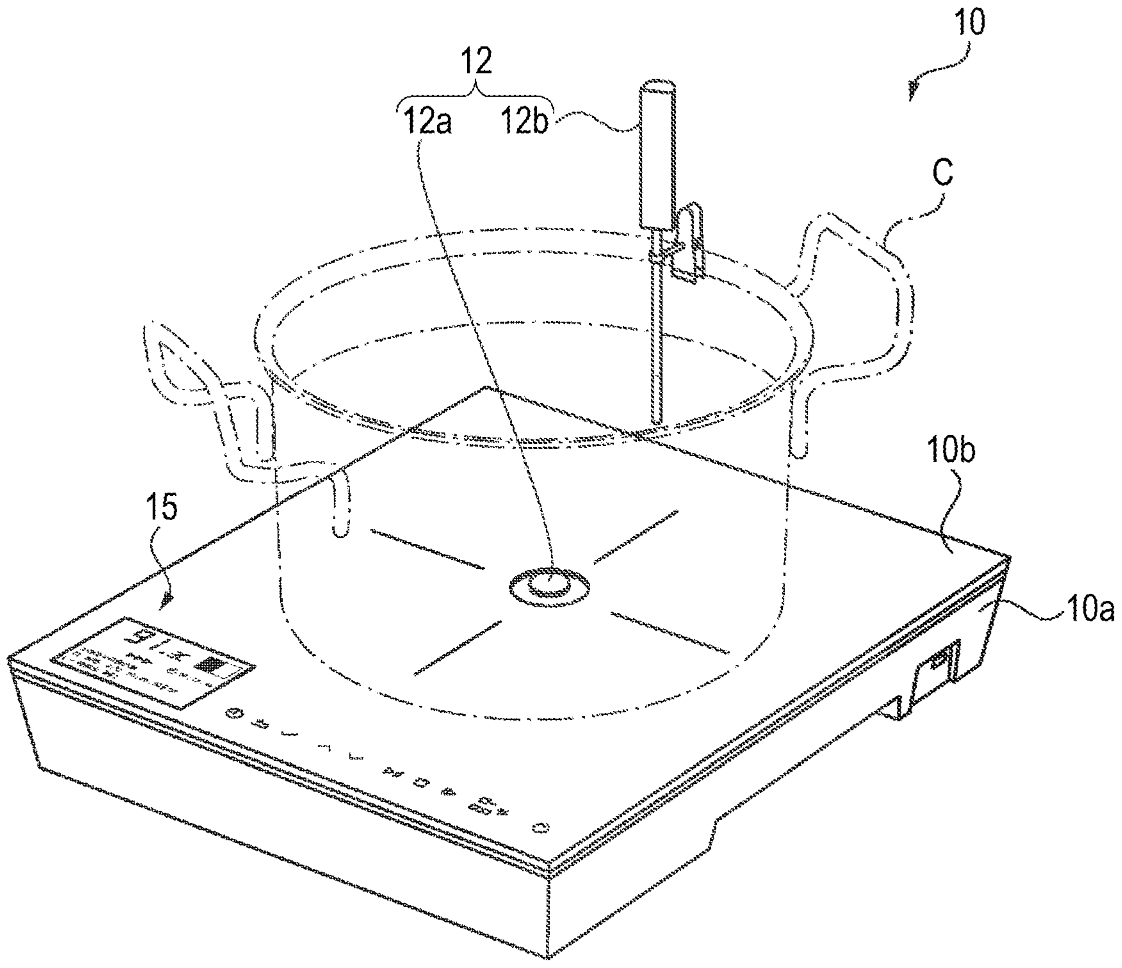
FIG. 1 is a schematic perspective view schematically showing a cooking device according to the present embodiment.
Figure 2:
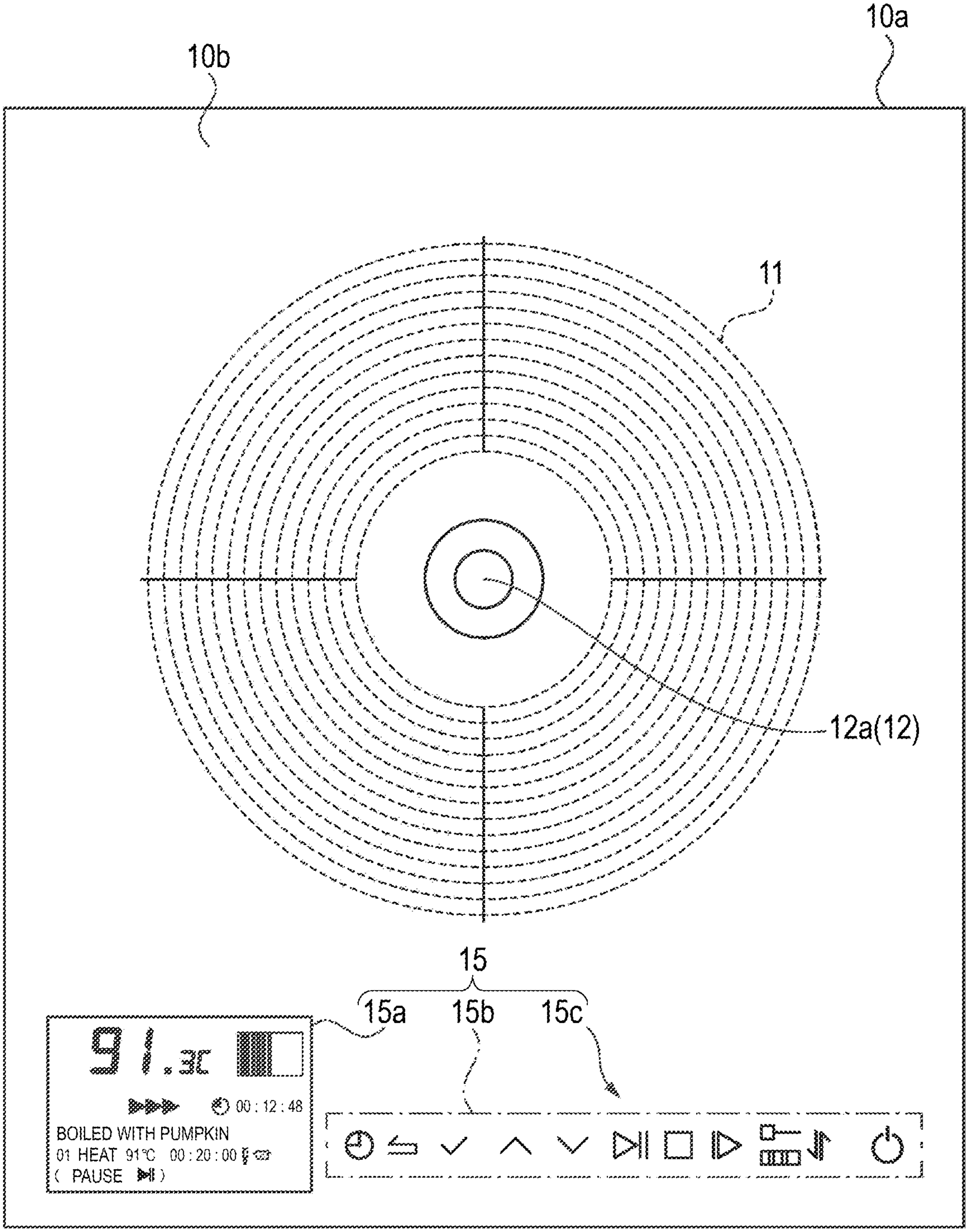
FIG. 2 is a schematic configuration view schematically showing the device in a plan view.

First, a configuration of a cooking system 1 according to the present embodiment will be described. FIG. 1 is a schematic perspective view schematically showing the cooking device 10 used in the cooking system 1 according to the present embodiment, and FIG. 2 is a schematic configuration diagram schematically showing the cooking device 10 in a plan view.

The cooking device 10 used in the present embodiment is an induction heating type cooker (IH cooking heater) that heats cookware C by performing induction heating generated by applying an alternating current to an induction heating coil disposed below a top plate 10*b*. In addition to the induction heating type cooker, the cooking device 10 may be a gas cooker such as a gas stove capable of electrically adjusting and controlling thermal power of gas.

The cookware C is a utensil such as a pot (including a pressure cooker), a frying pan, a kettle or a cooking plate such as an iron plate with which the cooking device 10 can perform cooking. In the present embodiment, since the cooking device 10 is described as an example of an IH cooking heater, the cookware C is a metal utensil capable of supporting induction heating.

In the cooking device 10, a body 10*a* is formed in a thin flat plate shape having a substantially rectangular shape in a plan view, and a heating unit 11 is provided on a lower surface side of the top plate 10*b* made of heat-resistant glass serving as a placement surface of the cookware C. The body 10*a* is made of heat-resistant resin or metal. A mark line serving as a mark for placing the cookware C at a correct position when the cookware C is placed is provided on the placement surface of the top plate 10*b*.

The heating unit 11 includes the induction heating coil wound in a spiral shape, and is provided on a lower surface of the top plate 10*b*. When a high-frequency current of a predetermined current amount is supplied to the heating unit 11 from a heating control unit 22 to be described later, magnetic force lines are generated so as to surround the induction heating coil, and the magnetic force lines generate innumerable eddy currents inside the metal cookware C. At a bottom portion of the cookware C, when the eddy currents flow, Joule heat is generated because of electrical resistance of the metal. An object to be heated contained in the cookware C is heated by the Joule heat.

The heating unit 11 may include a magnetic body made of a magnetic material such as ferrite that prevents leakage of magnetic flux generated from the induction heating coil, a magnetic shielding plate that prevents the magnetic force lines generated from the induction heating coil from flowing to a lower side of a base portion, and the like.

The cooking device 10 includes a temperature detection unit 12 including a body temperature detection unit 12*a* that detects a temperature of an outer surface of the bottom portion of the cookware C and an external temperature detection unit 12*b* that directly detects a temperature of a liquid (water or oil) as an object to be heated contained in the cookware C.

The temperature detection unit 12 detects a temperature of a temperature detection target. The temperature detection target of the temperature detection unit 12 is the liquid (water or oil) to be heated in the cookware C or the outer surface of the bottom portion of the cookware C.

The body temperature detection unit 12*a* includes, for example, a temperature sensor such as a thermistor, and is provided at a substantially central portion of the top plate 10*b*. The body temperature detection unit 12*a* detects the temperature of the outer surface of the bottom portion of the cookware C and outputs the detected temperature to a control unit 18 to be described later.

The external temperature detection unit 12*b* includes, for example, a temperature sensor such as a thermistor or a thermocouple, and is installed at an opening end portion of the cookware C. The external temperature detection unit 12*b* includes various communication modules necessary for performing data communication (wired or wireless) with the cooking device 10. The external temperature detection unit 12*b* directly detects the temperature of the liquid (water or oil) to be heated contained in the cookware C and outputs the temperature to the control unit 18.

The cooking device 10 includes an environmental information obtainment unit 13 that obtains, as environmental information, a physical quantity based on an environmental state of a kitchen (a kitchen of a general household, a kitchen of a restaurant, an outdoor campground, or the like) where the user cooks, and a weight detection unit 14 that detects a weight of the cookware C during cooking.

The environmental information obtainment unit 13 obtains the physical quantity based on the environmental state of the kitchen as the environmental information, and outputs the obtained physical quantity to the control unit 18. The environmental information obtainment unit 13 may include an outside air temperature detection unit 13*a* that detects a temperature of the kitchen (outside air temperature) and an atmospheric pressure detection unit 13*b* that detects an atmospheric pressure of the kitchen. Well-known sensor devices can be appropriately selected and used as the outside air temperature detection unit 13*a* and the atmospheric pressure detection unit 13*b*. In addition to the above configuration, the environmental information obtainment unit 13 may include a humidity detection unit including a humidity sensor capable of detecting a humidity of the kitchen.

The weight detection unit 14 includes, for example, a weight sensor such as a load cell and detects a weight value of the cookware C placed on the top plate 10*b* during cooking below the top plate 10*b* and outputs the weight value to the control unit 18. The weight detection unit 14 detects the weight value obtained by summing a weight of the cookware C and a weight of ingredients (water, cooking materials, seasonings and the like) contained in the cookware C. The weight value detected by the weight detection unit 14 is used, for example, when executing a cooking process in which an end timing of the process cannot be defined by cooking time, such as a cooking process in which heating is stopped when an amount of moisture in the cookware C decreases to a predetermined amount, or a cooking process in which the thermal power is gradually reduced as the amount of moisture in the cookware C decreases.

In vicinity of a front edge portion of the top plate 10*b* of the cooking device 10, for example, various display contents before and during cooking are displayed, and an operation display unit 15, which is operated when performing setting and management of various types of information such as cooking execution instruction and stop, cooking execution information, a cookware profile, and device information, is provided.

The operation display unit 15 includes a display area 15*a* where the various display contents are displayed and an operation area 15*b* where various operation buttons are displayed. The display area 15*a* is an interface that includes, for example, a display device such as a liquid crystal display (LCD) or an organic light-emitting diode (OLED) display and displays the display content based on a display control instruction from the control unit 18. The operation area 15*b* includes, for example, a touch panel. An operation principle of the touch panel is not particularly limited, but the cooking device 10 according to the present embodiment is often used in a kitchen where water is handled. Therefore, it is preferable to adopt a resistance film method that does not easily interfere with use even if the cooking device 10 gets wet with water.

In the display area 15*a*, "display content before cooking", "display content during cooking", "display content of selection system", "display content of setting system" and the like are displayed.

Examples of the "display content before cooking" include a temperature of a temperature target set in the cooking execution information, a candidate of cooking mode and cooking execution information selected when cooking is performed, cooking time set in the cooking execution information, and a display related to an operation assist for selecting and determining the cooking mode and cooking execution information. Here, the "temperature target" refers to a temperature control target when the cooking execution information is executed. In the present embodiment, the temperature target is a "water temperature" or an "oil temperature", which is a temperature of the object to be heated, or a "surface temperature of an inner surface of the cookware C". That is, when the temperature target of the cooking execution information is set to the "water temperature", the heating unit 11 is controlled such that the "water temperature" matches a cooking temperature set in the cooking process during cooking.

Examples of the "display content during cooking" include a temperature of the temperature target during cooking, the selected cooking execution information, a content of the cooking process being executed in the cooking execution information (an operation pattern, the cooking temperature, the cooking time and the like), and an operation assist display indicating an operation method of pausing during cooking.

Examples of the "display content of selection system" include a real-time temperature of a set temperature target, an indicator of the thermal power, an operation assist display such as selection and determination of a set temperature, a display of a candidate parameter, and the like.

Examples of the "display content of setting system" include a display related to preset management of the cooking execution information, a display related to setting of the cookware profile, a display related to communication setting for establishing (session) communication between the cooking device 10 and a mobile terminal 100, a display related to the device information (a device name, a connectable user name and the like), a display related to time setting, and the like.

Operation buttons 15*c* used for various operations are displayed in the operation area 15*b*. As shown in FIG. 2, the operation area 15*b* according to the present embodiment is an area indicated by a one-dot chain line in the drawing, and a plurality of operation buttons 15*c* formed of soft keys are displayed. Examples of the operation button 15*c* shown in FIG. 2 include, in order from a left side in FIG. 2, a "timer button" operated when the cooking time or the like is set, a "return button" for returning an operation being executed, a "determination button" for determining a selected or set content, "up and down buttons" for sending an item to be set to a next item or a previous item or increasing or decreasing a continuous numerical value such as time and temperature, a "start and pause button" operated when cooking is started and paused, a "stop button" for stopping cooking, a "skip button" for postponing a step in a cooking mode to a next step, and a "sensor switching button" for switching the body temperature detection unit 12*a* or the external temperature detection unit 12*b*. The operation button 15*c* is not limited to a soft switch on the touch panel, and may be a mechanical switch such as a push button.

Figure 3:
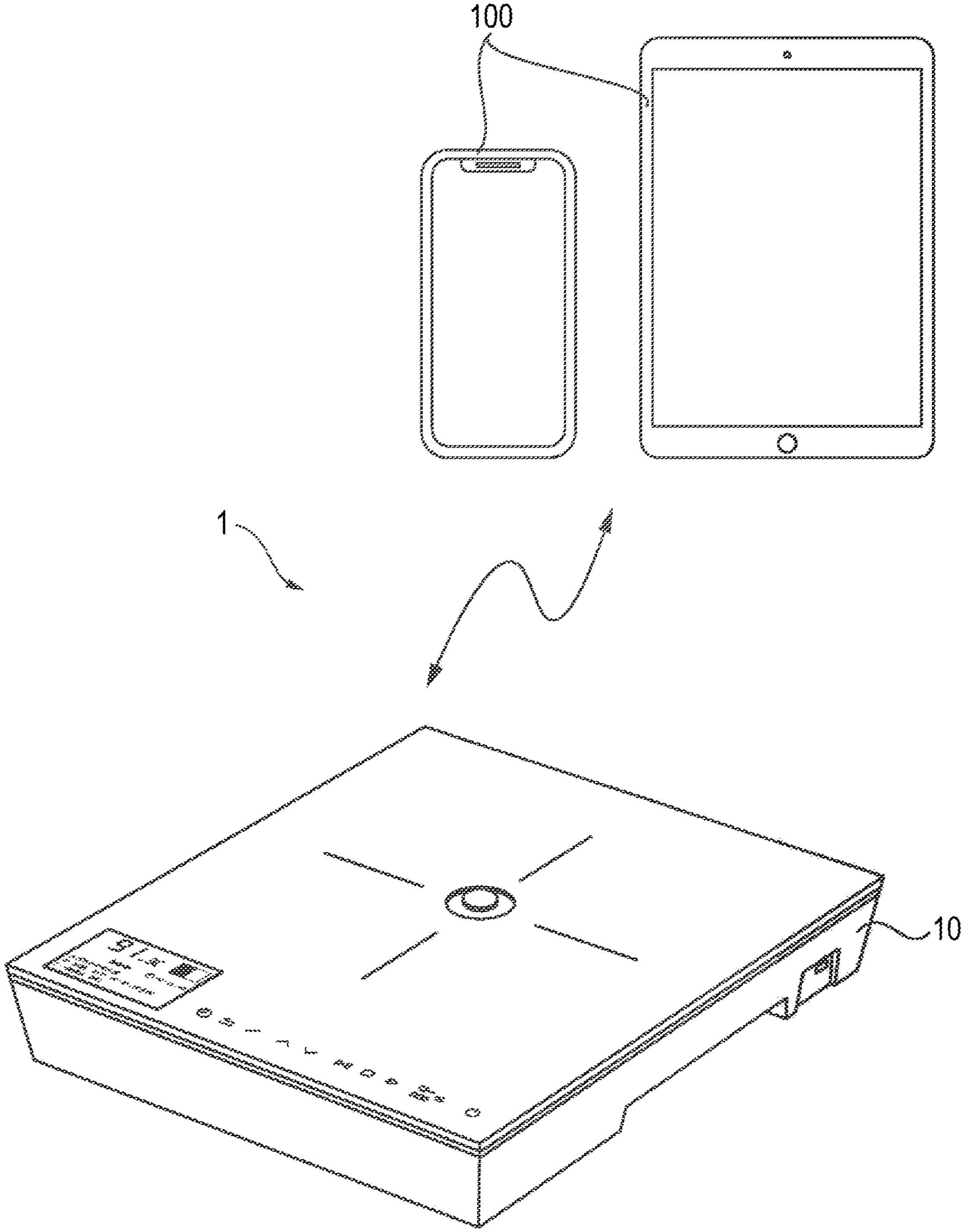
FIG. 3 is a schematic configuration view of a cooking system according to the present embodiment.

FIG. 3 is a view showing a schematic configuration of the cooking system 1. As shown in FIG. 3, in the cooking system 1, the cooking device 10 described above and a mobile terminal 100 carried by the user are connected so as to be capable of bidirectional communication. In the cooking system 1, when the user cooks, desired cooking can be performed by operating the operation display unit 15 of the cooking device 10.

In the cooking system 1, the mobile terminal 100 has functions that can be operated and set on the operation display unit 15, such as various setting functions of the cooking device 10 before and during cooking, a function of selecting and instructing execution of the cooking execution information, and a function of preparing and managing the cookware profile to be described later. Therefore, in the cooking system 1, if communication is established between a communication unit 16 of the cooking device 10 to be described later and a terminal communication unit 101 of the registered mobile terminal 100 carried by an owner or a guest user of the cooking device 10, the mobile terminal 100 can function as a controller for operating the cooking device 10. The mobile terminal 100 functioning as the controller will be described in detail later.

Figure 4:
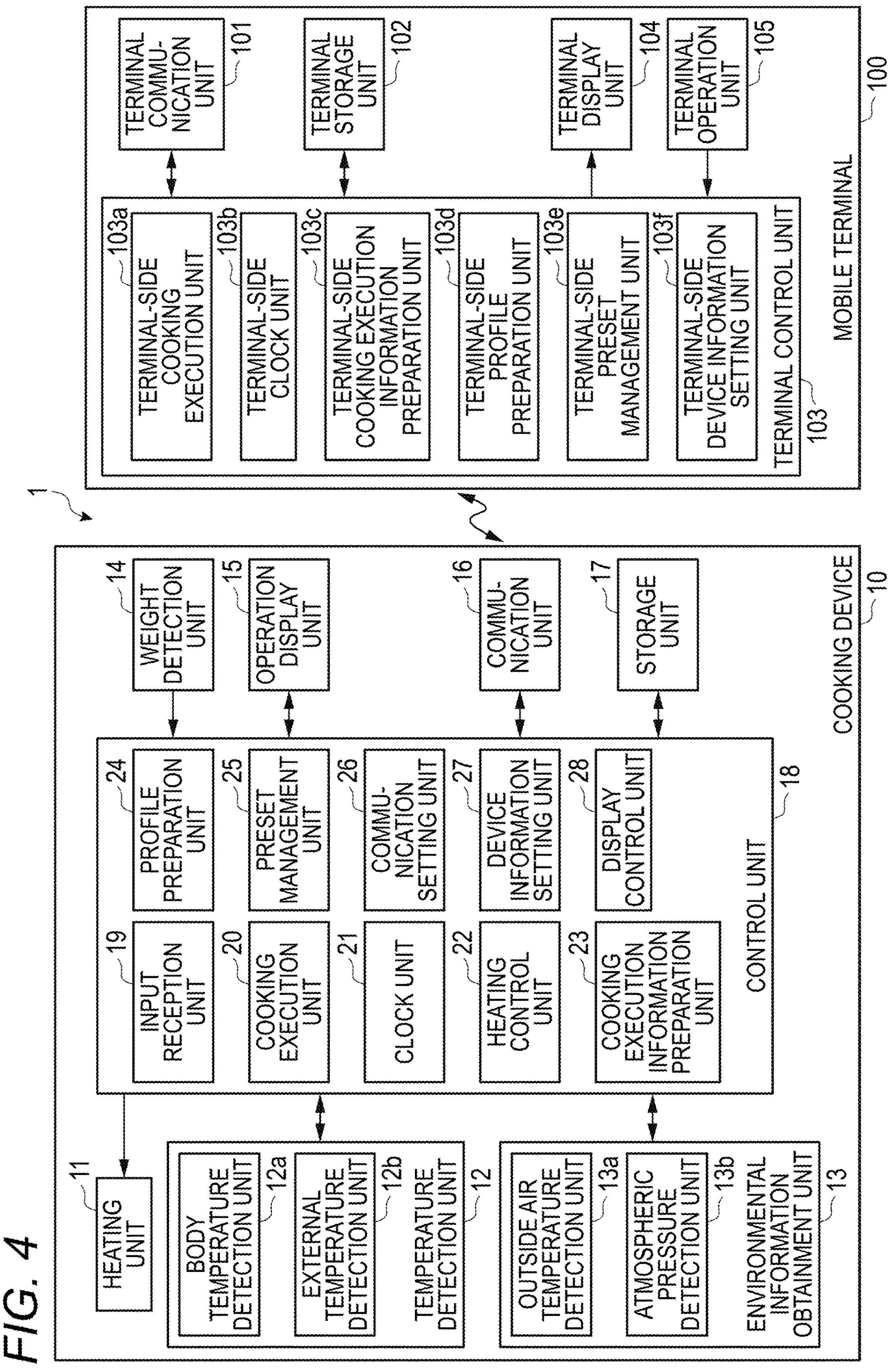
FIG. 4 is a functional block diagram of the cooking system according to the present embodiment.

Next, a control configuration of the cooking system 1 will be described. FIG. 4 is a functional block diagram of the cooking system 1. As shown in FIG. 4, the cooking device 10 includes the communication unit 16, a storage unit 17 and a control unit 18. In a configuration of the cooking device 10 shown in FIG. 4, description of configuration requirements described in the previous section will be omitted.

The communication unit 16 includes various communication modules necessary for performing data communication with the mobile terminal 100. The communication unit 16 establishes a communication state between the cooking device 10 and the registered mobile terminal 100, and sets the cooking device 10 and the registered mobile terminal 100 to a state in which bidirectional communication is possible. As a communication method with the mobile terminal 100, Bluetooth (registered trademark), Wi-Fi (registered trademark), infrared communication, NFC or the like can be used in a case of wireless communication regardless of wired communication or wireless communication.

The storage unit 17 includes a general-purpose storage device such as a nonvolatile memory such as a flash memory. The storage unit 17 stores a cooking execution information database in which preset cooking execution information is organized, a profile database in which cookware profiles for each cookware C are organized, device information of the cooking device 10 set after a start of use of the cooking device 10, and a control program for performing drive control of units constituting the cooking device 10.

The cooking execution information database stores recipe execution information, multi-step execution information and single-step execution information, which are the cooking execution information, in a state of being organized by type. The profile database stores, for example, cookware information of the cookware C (for example, information indicating specifications of the cookware C such as a name of the cookware C, a size (a capacity and a diameter) of the cookware C, and a material of the cookware C) and a cookware profile of each cookware C in association with each other.

The control unit 18 includes, for example, a processor such as a central processing unit (CPU), a read only memory (ROM) and a random access memory (RAM), and executes a predetermined control program stored in the storage unit 17 to comprehensively perform various controls related to driving of the cooking device 10. The control unit 18 includes an input reception unit 19, a cooking execution unit 20, a clock unit 21, a heating control unit 22, a cooking execution information preparation unit 23, a profile preparation unit 24, a preset management unit 25, a communication setting unit 26, a device information setting unit 27, and a display control unit 28.

The input reception unit 19 receives a control instruction based on a content of an operation performed on the operation display unit 15 or a control instruction from the mobile terminal 100. Upon receiving the control instruction, the input reception unit 19 outputs the control instruction to an output destination.

Examples of the control instruction received by the input reception unit 19 include a selection instruction of a cooking mode and various parameters before cooking, an instruction before or during cooking (an instruction to start, pause, skip, stop or the like), an instruction at the time of cooking mode preparation or profile preparation (a selection instruction at the time of cooking mode selection, an instruction to set various parameters at the time of cooking mode setting, a condition setting instruction at the time of profile preparation, or the like), an instruction at the time of preset management (a determination instruction to delete, update or initialize an item to be preset), an instruction at the time of communication setting between the cooking device 10 and the mobile terminal 100 (a determination instruction at the time of password input, a determination instruction of a connection method, or the like), and an instruction at the time of device information setting (a determination instruction after setting of a device name, a user name, a time, or the like).

When a "cooking mode" is selected as an operation mode and cooking execution information corresponding to the cooking mode is selected, the cooking execution unit 20 drives the heating control unit 22 to control the heating unit 11, by appropriately using a temperature value detected by the temperature detection unit 12 (at least one of the body temperature detection unit 12*a* and the external temperature detection unit 12*b*), measured time for each cooking process measured by the clock unit 21, environmental information obtained by the environmental information obtainment unit 13, and a cookware profile stored in the storage unit 17, such that a temperature target set in the cooking execution information matches an appropriate temperature in each cooking process.

While the cooking execution unit 20 is executing the cooking execution information, the cooking execution unit 20 sequentially monitors the temperature value of at least one of the body temperature detection unit 12*a* and the external temperature detection unit 12*b*, and controls a temperature of the predetermined temperature target so as to achieve a set cooking temperature. When the cooking execution unit 20 executes the cooking execution information by using only the temperature detected by the body temperature detection unit 12*a*, the cooking execution unit 20 predicts the temperature of the temperature target by correcting the measured temperature value detected by the body temperature detection unit 12*a* using the cookware profile of the cookware C to be used, and controls the heating unit 11 such that the predicted temperature as the prediction result matches the cooking temperature set in each cooking process. That is, the cooking execution unit 20 adjusts and controls power supplied from the heating control unit 22 to the heating unit 11 using the cookware profile such that the predicted temperature matches the cooking temperature.

When the cooking execution information is executed, the cooking execution unit 20 reflects the environmental information obtained by the environmental information obtainment unit 13 and adjusts heating output of the cooking process as necessary. For example, when making a clear consomme soup in French cuisine, fine fire control called "Mijote" (fire control to such an extent that a water surface sways and sometimes foams" is required. However, when an environment of the kitchen changes, for example, when a low atmospheric pressure approaches and an atmospheric pressure decreases, or when cooking is performed at a place whose altitude is relatively high, a boiling point decreases, so that a desired fire control cannot be obtained, and the clear soup may not be obtained due to excessively generated steam bubbles. Therefore, in the cooking device 10 according to the present embodiment, by obtaining the environmental information of the kitchen and reflecting the environmental information in the cooking execution information, fine output control of the heating unit 11 can be performed according to an environmental state of the kitchen particularly when boiling processing is included in the cooking process. Therefore, in the cooking device 10, output control of the heating unit 11 can also be performed so as to generate an amount of steam bubbles like "Mijote" when making the above clear consomme soup.

The cooking execution unit 20 executes thermal power adjustment processing based on a weight value detected by the weight detection unit 14, For example, recipe information for making a bouillon in a recipe mode includes a cooking process in which fire is turned off when an amount of water contained in the cookware C changes from 4 L to 2 L. In this case, even if cooking time is simply set, the amount of water may not be a designated amount. However, in the cooking execution unit 20, since a timing of turning off the tire can be determined based on the weight value detected by the weight detection unit 14, heating can be continued until the designated amount of water is reached, and the heating can be stopped when the amount of water reaches the predetermined amount. When making the bouillon, it is important to maintain a constant boiling level (a foaming level of steam bubbles) at all times. However, when a constant thermal power is continuously applied by a related-art cooking device, as an amount of water in the object to be heated decreases due to evaporation, the thermal power becomes relatively excessive than initially expected, and a foaming level gradually increases. In contrast, in the cooking execution unit 20, the heating unit 11 can be controlled so as to gradually decrease the thermal power in proportion to a decrease in the amount of water based on the weight value detected by the weight detection unit 14, so that a constant foaming level can be maintained until an end of cooking.

When the cooking process of the cooking execution information includes, for example, a process of continuously kneading while maintaining a predetermined temperature, the cooking execution unit 20 can set an upper limit to the temperature value detected by the body temperature detection unit 12*a* in the cooking process and control the heating control unit 22 so as not to exceed the upper limit. For example, when "custard" is cooked as recipe information, a cooking process of continuously kneading a semi-solid material at a constant temperature for a predetermined time is included, but if a temperature of the bottom portion of the cookware C is too high, a part of the material in contact with the bottom portion of the cookware C may burn. Therefore, in the cooking execution unit 20, an upper limit is set for the temperature value detected by the body temperature detection unit 12*a*, and the heating control unit 22 is controlled such that a temperature of the outer surface of the bottom portion of the cookware C does not exceed the upper limit. Thereby, the cooking device 10 can prevent scorching of the material as compared with cooking using a general cookware, and thus has an effect of remarkably improving convenience.

When executing a cooking process in which "boiling" is selected as the operation pattern, the cooking execution unit 20 controls the heating control unit 22 to obtain appropriate thermal power based on the cookware profile of the cookware C to be used. The cooking execution unit 20 controls the heating control unit 22 using the environmental information obtained by the environmental information obtainment unit 13 in addition to the cookware profile, so that the thermal power of the heating unit 11 can be adjusted with higher accuracy.

Next, cooking based on the cooking execution information executed by the cooking execution unit 20 will be described for each cooking mode. The cooking mode executed by the cooking execution unit 20 includes a "recipe mode", a "multi-step mode", and a "single-step mode" as preset modes. The cooking mode includes a "legacy mode" in which cooking is performed by adjusting the thermal power, which is a general method of using a cooking device.

—Recipe Mode—

The recipe mode is a mode in which temperature control and cooking time control of the cooking device 10 are performed based on recipe information in which a cooking process is set in advance according to a cooking procedure, such as a cooking recipe published by a professional cook, a cooking researcher or the like, or a cooking recipe published by a research and educational institution. When cooking is performed in the recipe mode, the user selects the recipe mode as the cooking mode and selects desired recipe information.

Parameters included in the recipe information include "dish name", "cooking procedure and cooking process of dish", "cooking temperature and cooking time for each cooking process", "presence or absence of standby processing before and after cooking process", "time of standby processing", and the like, and these parameters are appropriately set for each cooking process of dish and combined according to the cooking procedure. When the recipe mode is selected as the cooking mode, the cooking execution unit 20 controls the clock unit 21 and the heating control unit 22 such that the cooking process is sequentially executed according to the recipe information selected together with the recipe mode.

—Multi-Step Mode—

The multi-step mode is a mode in which temperature control and cooking time control of the cooking device 10 are performed according to multi-step execution information obtained by combining a plurality of cooking processes. When cooking is performed in the multi-step mode, the user selects the multi-step mode as the cooking mode, selects desired multi-step execution information, and sets a predetermined parameter. When the multi-step mode is selected as the cooking mode, the cooking execution unit 20 controls the clock unit 21 and the heating control unit 22 such that the cooking process is sequentially executed according to the multi-step execution information set together with the multi-step mode.

—Single-Step Mode—

The single-step mode is a mode in which temperature control and cooking time control of the cooking device 10 are performed according to single-step execution information of one pattern in a cooking process. When cooking is performed in the single-step mode, the user selects the single-step mode as the cooking mode, selects desired single-step execution information, and sets a predetermined parameter. When the single-step mode is selected as the cooking mode, the cooking execution unit 20 controls the clock unit 21 and the heating control unit 22 such that the cooking process is executed according to the single-step execution information selected together with the single-step mode.

—Legacy Mode—

The legacy mode is a cooking method similar to that of a general cooking device, that is, a mode in which cooking is performed by adjusting thermal power of the heating unit 11 by operating the operation button 15*c* of the operation display unit 15. When the legacy mode is selected as the cooking mode, the cooking execution unit 20 controls the heating control unit 22 according to an operation instruction from the operation display unit 15.

The clock unit 21 is, for example, a circuit such as a real time clock (RTC), and has a function as an internal clock that measures time, and a function as a timer that measures time necessary for various types of control such as when cooking is performed and when a cookware profile is set. The clock unit 21 outputs a time measurement end signal after measuring the set time. The time measurement end signal functions as, for example, a trigger for notifying an end of a predetermined cooking process.

The heating control unit 22 includes an inverter circuit, receives power supply from an external power supply (commercial power supply), temporarily rectifies the power into DC pulse power, converts the DC pulse power into a high-frequency AC current of, for example, about 20 to 50 KHz, and supplies the high-frequency AC current to the heating unit 11. A current amount of the high-frequency AC current supplied from the heating control unit 22 to the heating unit 11 is appropriately controlled according to a cooking process being executed by the cooking execution unit 20 or a profile preparation process being executed by the profile preparation unit 24.

The cooking execution information preparation unit 23 prepares cooking execution information corresponding to the cooking mode set when the user cooks, based on various parameters set by the user. In the cooking system 1 according to the present embodiment, "multi-step execution information" and "single-step execution information" among preset cooking execution information can be prepared. The cooking execution information preparation unit 23 outputs the prepared cooking execution information to the preset management unit 25.

—Multi-Step Execution Information—

When preparing the multi-step execution information, the user appropriately sets "operation pattern", "type of temperature detection unit 12 to be used", "type of temperature target", "cooking temperature" and "cooking time" for each cooking process, "trigger setting", "standby processing and standby processing time", "presence or absence of lid", "loop step" and the like as parameters so as to obtain desired multi-step execution information.

The "operation pattern" includes "heating (low temperature)" in which cooking is performed in a range of, for example, 30° C. to 99° C., "heating (high temperature)" in which cooking is performed in a range of, for example, 100° C. to 200° C., "boiling" in which water is boiled, "standby" that is a standby state when another process is performed before and after a cooking process, "loop" in which a predetermined cooking process is repeatedly performed, and "end" in which cooking is ended, and is appropriately set so as to achieve a cooking procedure desired by the user.

As the "type of temperature detection unit 12 to be used", the "body temperature detection unit 12*a*" or the "external temperature detection unit 12*b*" is set as the temperature detection unit 12 to be used during cooking.

As the "type of temperature target", any one of the "water temperature", the "oil temperature" and the "surface temperature of the inner surface of the bottom portion of the cookware C" is set as a temperature target.

As the "cooking temperature", a control temperature of the temperature target for each cooking process is set in the set operation pattern.

As the "cooking time", a duration when the temperature target for each cooking process reaches a predetermined cooking temperature is set in the set operation pattern.

As the "trigger setting", for example, "time" or "predetermined button operation" is set as a trigger for shifting (skipping) to the next cooking process.

As the "standby processing and standby processing time", processings of temporarily waiting a cooking process in order to execute predetermined processing (addition of ingredients, filtering work of ingredients, and the like) during the cooking process to be executed, and time of the standby processing are set.

The "presence or absence of lid" is set when the "heating (low temperature)" is selected as the operation pattern, the "body temperature detection unit 2*a*" is selected as the temperature detection unit to be used, and the "water temperature" or the "oil temperature" is selected as the temperature target. That is, the presence or absence of a lid is set when cooking that requires the lid as a cooking process is performed.

The "loop step" is set for the cooking process repeatedly performed when the "loop" is selected as the operation pattern.

When the multi-step execution information is set, if the "heating (high temperature)" is selected as the operation pattern and the "external temperature detection unit 12*b*" is selected as the temperature detection unit 12 to be used, the "oil temperature" is automatically set as the temperature target. When the "boiling" is selected as the operation pattern, the "water temperature" is automatically set as the temperature target.

When the "standby" is selected as the operation pattern in the cooking process after the "heating" or the "boiling", "additional heating" in which heating is additionally performed after standby can be added to the cooking process. When the "additional heating" is set, a "target temperature" for heating the temperature target to a target temperature, a "trigger" for proceeding to the next step, and the "presence or absence of lid" are set. As the "trigger" for canceling the standby, a time measurement end signal output from the clock unit 21 when set standby time has elapsed or an operation signal when a predetermined operation button (for example, a skip button) is operated is set.

—Single-Step Execution Information—

When preparing the single-step execution information, the user appropriately sets "operation pattern", "type of temperature detection unit 12 to be used", "type of temperature target", "cooking temperature", "cooking time", "trigger setting" and "presence or absence of lid" as parameters so as to obtain desired single-step execution information.

The "operation pattern" includes the "heating (low temperature)", the "heating (high temperature)" and the "boiling" described above, and one of these parameters is set. The "type of temperature detection unit 12 to be used", "type of temperature target", "cooking temperature", "cooking time", "trigger setting" and "presence or absence of lid" are the same as the parameters set in the multi-step execution information, and parameters corresponding to the selected operation pattern can be set.

When the single-step execution information is set, if the "heating (high temperature)" is selected as the operation pattern and the "external temperature detection unit 12*b*" is selected as the temperature detection unit 12 to be used, "oil temperature" is automatically set as the temperature target. When the "boiling" is selected as the operation pattern, the "water temperature" is automatically set as the temperature target.

When the "setting mode" is selected as the operation mode and "profile preparation processing" is selected as a processing content, the profile preparation unit 24 prepares a cookware profile of the cookware C used by the user. The "cookware profile" is information in which the "cookware information" of the cookware C is associated with "time-lapse temperature difference information" indicating a dynamic relationship of a temperature difference for each elapsed time obtained by temporally observing the temperature difference between a temperature of the outer surface of the bottom portion of the cookware C detected by the body temperature detection unit 12*a* and a temperature of the object to be heated in the cookware C detected by the external temperature detection unit 12*b* when preset calibration processing is executed. The cookware profile is prepared for each cookware C to be used. In the calibration processing executed by the profile preparation unit 24, operations of a "heating process (a process of performing heating processing on the object to be heated)", a "heat retaining process (a process of retaining heat of the object to be heated at a predetermined temperature)", and a "heat radiating process (a process of stopping the heating processing and radiating heat of the object to be heated)" are executed for the cookware C containing a predetermined amount of liquid (water or oil) serving the object to be heated contained in the cookware C.

As the profile preparation processing by the profile preparation unit 24, for example, the calibration processing is executed in a state where the object to be heated of about half to ⅔ of a total capacity of the cookware C is contained in the cookware C to be used. When the calibration processing is started, the profile preparation unit 24 obtains a temperature value detected by the body temperature detection unit 12*a* (that is, a measured temperature value of the outer surface of the bottom portion of the cookware C) and a temperature value detected by the external temperature detection unit 12*b* (that is, a measured temperature value of the object to be heated in the cookware C) at predetermined time intervals (for example, every second). The profile preparation unit 24 sequentially observes a temperature difference between the measured temperature value by the body temperature detection unit 12*a* and the measured temperature value detected by the external temperature detection unit 12*b* in each process performed in the calibration processing along the elapsed time of the calibration processing. The profile preparation unit 24 corrects the temperature value (measured temperature value) detected by the body temperature detection unit 12*a* based on the time-lapse temperature difference information obtained from the dynamic relationship of the temperature difference for each elapsed time obtained by the calibration processing, and creates the cookware profile for predicting temperature values of a temperature of the object to be heated in the cookware C and a surface temperature of the inner surface of the bottom portion of the cookware C (that is, the temperature target) based on the corrected measured temperature value.

When executing the calibration processing, if the temperature of the object to be heated contained in the cookware C is equal to or higher than a room temperature (for example, 28° C.), the profile preparation unit 24 notifies the user of a warning since the correct calibration processing cannot be executed. The warning may be displayed on the operation display unit 15 of the cooking device 10 or the terminal display unit 104 of the mobile terminal 100, or may be notified to the mobile terminal 100 by ringing.

In the cookware C, a temperature difference occurs between the temperature of the outer surface of the bottom portion of the cookware C and the surface temperature of the inner surface of the bottom portion of the cookware C or the temperature of the contained object to be heated (water temperature or oil temperature), depending on, for example, a type of metal material constituting the cookware C and a thickness of the cookware C. When the body temperature detection unit 12*a* is used as the temperature detection unit 12, the cooking execution unit 20 performs temperature control based on the temperature of the outer surface of the bottom portion of the cookware C, that is, the measured temperature value by the body temperature detection unit 12*a*, and thus an error may occur between the temperature detected by the body temperature detection unit 12*a* and the surface temperature of the inner surface of the bottom portion of the cookware C or the actual temperature of the contained object to be heated. However, in the cooking device 10 according to the present embodiment, since the cookware profile is prepared for each cookware C, the temperature value of the surface temperature of the inner surface of the bottom portion of the cookware C or the object to be heated can be accurately predicted by correcting the measured temperature value detected by the body temperature detection unit 12*a* according to each cookware C to be used, and thus a temperature of the temperature target can be controlled with high accuracy. In particular, since the external temperature detection unit 12*b* cannot be used for cooking with a lid or stir-fried food using a frying pan, it is effective.

Figure 5:
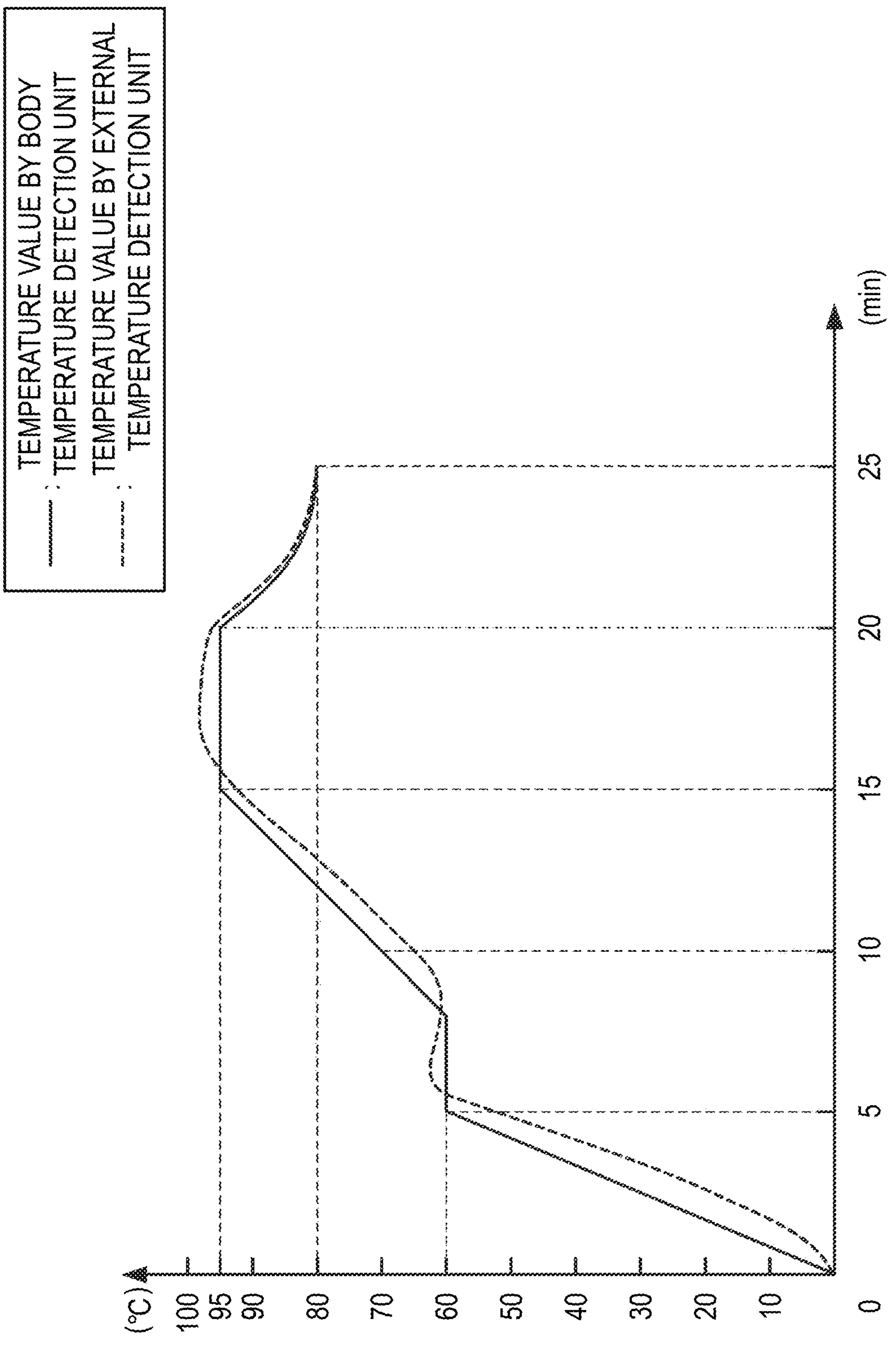
FIG. 5 is a graph showing an example of a temperature locus of a temperature value detected by a body temperature detection unit and a temperature value detected by an external temperature detection unit when calibration processing is performed on cookware whose profile is to be prepared.

FIG. 5 is a graph showing an example of a temperature locus of the temperature value detected by the body temperature detection unit 12*a* and the temperature value detected by the external temperature detection unit 12*b* when the calibration processing is executed on the cookware C whose profile is to be prepared. In the drawing, a solid line indicates the temperature value detected by the body temperature detection unit 12*a* for each elapsed time in the calibration processing, and a dotted line indicates the temperature value detected by the external temperature detection unit 12*b*. In the graph shown in FIG. 5, a vertical axis represents temperature (° C.) and a horizontal axis represents time (min), and as an example of the calibration processing, the calibration processing is executed in an order of "heating process"→"heat retaining process (60° C.)"→"heating process"→"heat retaining process (95° C.)"→"heat radiating process".

As shown in FIG. 5, when the calibration processing is executed, a temperature difference occurs between the measured temperature value detected by the body temperature detection unit 12*a* and the measured temperature value detected by the external temperature detection unit 12*b*. As shown in FIG. 5, the temperature difference between the measured temperature values detected by the temperature detection units changes over time, and is not a constant temperature difference. For this reason, when temperature correction is executed, it is not possible to uniformly correct the measured temperature value by the body temperature detection unit 12*a*, such as "correcting by lowering (or raising) OO° C.". Therefore, the profile preparation unit 24 compares the measured temperature value by the body temperature detection unit 12*a* with the measured temperature value by the external temperature detection unit 12*b* to correct the measured temperature value by the body temperature detection unit 12*a*, and creates the cookware profile for predicting the temperature of the object to be heated as the temperature target and the surface temperature of the inner surface of the bottom portion of the cookware C based on the measured temperature value of the outer surface of the bottom portion of the cookware C.

The profile preparation unit 24 can execute profile prediction processing of searching a profile database for a cookware profile approximate to the temperature locus of the newly prepared cookware profile, and predicting the temperature locus by superimposing and comparing the cookware profiles. For example, when processing time of the calibration processing is normally set to 20 minutes, the profile preparation unit 24 executes the calibration processing in 10 minutes, which is half of the processing time. At this time, after the calibration processing to be newly prepared ends, the profile preparation unit 24 collates the calibration processing result with the past cookware profile approximate to the processing result. Thereby, the profile preparation unit 24 can predict a temperature locus of the remaining half of the normal calibration processing time, and can shorten profile preparation time.

When the "setting mode" is selected as the operation mode and "preset management processing" is selected as the processing content, the preset management unit 25 executes new registration processing, overwrite processing and deletion processing of preset cooking execution information. The preset management unit 25 executes the above-described processing according to a control instruction related to preset management from the operation display unit 15 or the mobile terminal 100.

When a structural change in recipe information such as "type of operation pattern", "addition and deletion of cooking process" and "setting of loop step" in the preset recipe information is added, the preset management unit 25 can temporarily register target recipe information as multi-step execution information and execute recipe information change processing of changing a predetermined parameter of the multi-step execution information. Thereby, if the user registers the recipe information as the multi-step execution information, the user can change the content of the cooking process of the recipe information.

Upon receiving an initialization instruction from the mobile terminal 100 registered as the owner, the preset management unit 25 executes initialization processing of initializing various types of information set after the cooking device 10*a* starts to be used, such as the cooking execution information database, the profile database and the device information stored in the storage unit 17, to restore a factory default state. The initialization processing is executed when an initialization execution instruction that can be output only from the mobile terminal 100 registered as the owner is received. That is, in the cooking system 1 according to the present embodiment, the initialization processing is executed only from the mobile terminal 100 registered as the owner, and the initialization processing is not performed from the mobile terminal 100 and the cooking device 10 registered by the guest.

When the "setting mode" is selected as the operation mode and "communication setting processing" is selected as the processing content, the communication setting unit 26 executes communication establishment processing according to a communication method such that a communication state between the cooking device 10 and the mobile terminal 100 or the external temperature detection unit 12*b* is established. The communication setting unit 26 executes the above-described processing according to a control instruction related to communication setting from the operation display unit 15 or the mobile terminal 100. When the communication state is established by the communication setting unit 26, the cooking device 10 can bidirectionally communicate with the mobile terminal 100. The mobile terminal 100 executes predetermined registration processing on the cooking device 10 in order to establish communication with the cooking device 10. The mobile terminal 100 carried by the user who is the owner of the cooking device 10 executes the registration processing to become a "mobile terminal registered as the owner" on the cooking device 10. It is also possible to register a mobile terminal 100 (for example, a mobile terminal carried by a guest user who is authorized as a user serving as an owner) other than the mobile terminal 100 registered as the owner. The mobile terminal 100 registered as the guest user can control the cooking device 10 in various ways as a remote controller for the cooking device 10. The mobile terminal 100 registered as the guest is in a state where a certain restriction is imposed on a function executable by the mobile terminal 100 registered as the owner.

When communication with the mobile terminal 100 or the external temperature detection unit 12*b* as a connection destination is established, the communication setting unit 26 outputs a connection completion notification indicating that the communication is established. When the communication with the connection destination cannot be established, the communication setting unit 26 outputs a notification (reconfirmation notification) for prompting reconfirmation of a connection setting content. The reconfirmation notification is output to cause the user to reconfirm the setting content when the communication between the cooking device 10 and the connection destination is not established, for example, when a password content is erroneously input, when the device is defective, or when a radio wave state is unstable. The reconfirmation notification of the connection setting content may be displayed on the operation display unit 15 of the cooking device 10 or the terminal display unit 104 of the mobile terminal 100, or may be notified to the mobile terminal 100 by ringing.

When the "setting mode" is selected as the operation mode and "device information setting processing" is selected as the processing content, the device information setting unit 27 executes processing related to setting and updating of device information. The device information setting unit 27 executes, as the device information setting processing, registration and change processing of a device name of the cooking device 10, update processing of a control program of the cooking device 10, user registration processing, time selling and correction processing, time setting processing for turning off a power supply when no operation is performed, temperature display mode (° C./° F.) setting processing, and the like. The device information setting unit 27 executes the above-described processing according to a control instruction related to device selling from the operation display unit 15 or the mobile terminal 100.

The display control unit 28 causes the display area 15*a* of the operation display unit 15 to display a display content displayed when the cooking device 10 is operated. The display control unit 28 performs, for example, control for switching screens or changing the display content according to a control instruction received by the input reception unit 19, and control for changing the display content according to a progress status of the cooking execution information executed by the cooking execution unit 20.

Next, a configuration of the mobile terminal 100 will be described. The mobile terminal 100 is a variety of mobile communication terminals carried by the user, such as a mobile phone, a smartphone or a tablet terminal. The mobile terminal 100 includes the terminal communication unit 101, a terminal storage unit 102, a terminal control unit 103, a terminal display unit 104 and a terminal operation unit 105.

The terminal communication unit 101 includes various communication modules required for performing data communication with the cooking device 10. As a communication method with the cooking device 10, Bluetooth (registered trademark), Wi-Fi (registered trademark), infrared communication, NFC or the like can be used in a case of wireless communication regardless of wired communication or wireless communication.

The terminal storage unit 102 includes, for example, a non-volatile memory such as a flash memory or a general-purpose storage device such as an SD card. The terminal storage unit 102 stores various control programs necessary for causing the mobile terminal 100 to function as a normal mobile communication terminal.

The terminal storage unit 102 stores (installs) a cooking system app for executing various control processing sequences of the cooking device 10 to cause the mobile terminal 100 to function as a remote controller of the cooking device 10. The cooking system app is downloaded or installed from outside via the terminal communication unit 101. The terminal storage unit 102 also stores information necessary for driving the cooking device 10 by remote control, such as the cooking execution information database and the profile database stored in the storage unit 17 of the cooking device 10. The terminal storage unit 102 is not limited to a storage device mounted on the mobile terminal 100, and a cloud storage such as an external server may be used.

The terminal control unit 103 includes, for example, a processor such as a central processing unit (CPU), a read only memory (ROM) and a random access memory (RAM). The terminal control unit 103 executes various control programs stored in the terminal storage unit 102 so as to function as a normal portable communication terminal based on an operation instruction from the terminal operation unit 105. The terminal control unit 103 executes processing related to display control, such as control for switching images to be displayed on the terminal display unit 104 or changing the display content based on operation information operated by the terminal operation unit 105, and control for changing the display content according to the progress status of the cooking execution information executed by the cooking execution unit 20.

The terminal control unit 103 activates the cooking system app stored in the terminal storage unit 102 to implement functions of respective units constituting the control unit 18 of the cooking device 10. The mobile terminal 100 can drive and control the cooking device 10 to be controlled according to the processing sequence of the cooking system app. Therefore, the mobile terminal 100 can function as a remote controller that allows the cooking device 10 to be remotely controlled.

When the cooking system app is activated, the terminal control unit 103 includes configurations shown in FIG. 4. Specifically, the terminal control unit 103 includes a terminal-side cooking execution unit 103*a* that implements a function of the cooking execution unit 20 of the control unit 18, a terminal-side clock unit 103*b* that implements a function of the clock unit 21 of the control unit 18, a terminal-side cooking execution information preparation unit 103*c* that implements a function of the cooking execution information preparation unit 23 of the control unit 18, a terminal-side profile preparation unit 103*d* that implements a function of the profile preparation unit 24 of the control unit 18, a terminal-side preset management unit 103*e* that in a function of the preset management unit 25 of the control unit 18, and a terminal-side device information setting unit 103*f* that implements a function of the device information setting unit 27 of the control unit 18.

When the terminal control unit 103 functions as a remote controller of the cooking device 10, the terminal control unit 103 transmits a control instruction corresponding to operation information operated by the terminal operation unit 105 to the cooking device 10 via the terminal communication unit 101, When a cooking temperature of 100° C. or higher is set in the cooking process, the terminal control unit 103 performs control such that an operation from the mobile terminal 100 related to cooking is disabled from a viewpoint of safety.

The terminal-side preset management unit 103*e* outputs an initialization execution instruction for causing the cooking device 10 to execute "initialization processing" of initializing various types of information set after the cooking device 10 starts to be used, such as the cooking execution information database, the profile database and device information stored in the storage unit 17, to restore a factory default state. The initialization processing can be instructed only from the mobile terminal 100 registered as the owner. Thereby, the cooking device 10 can be prevented from executing unintended initialization processing by another person. When the user transfers the cooking device 10 to another person, the user himself or herself performs the initialization processing using the mobile terminal 100 registered as the owner, and thus there is no concern that personal information of the user stored in the storage unit 17 illegally flows out.

The terminal display unit 104 includes a display device such as a liquid crystal display or an organic EL display. The terminal control unit 103 displays various display contents necessary for driving the mobile terminal 100 in the display area in addition to the display content displayed in conjunction with activation of the cooking system app under the control of the terminal control unit 103.

The terminal operation unit 105 includes various input devices such as mechanical operation keys such as selection buttons and a user interface (UI) such as a touch panel in which a touch sensor is provided on a display screen of the terminal display unit 104. If a predetermined operation is performed on the terminal operation unit 105 when the mobile terminal 100 is used as the remote controller of the cooking device 10, operation information corresponding to the operation content is output to the terminal control unit 103 via the terminal communication unit 101.

[Processing Operation]

Next, a processing operation of the cooking system 1 described above will be described with reference to FIGS. 6 to 8, Each operation described below is presented with step elements in an exemplary order, and is not limited to the presented specific order. Therefore, an order of each of flowcharts shown in FIGS. 6 to 8 can be changed as long as there is no contradiction in a processing result. Each of the following processing is an operation example when the cooking device 10 is mainly operated.

<System Outline Flow>

Figure 6:
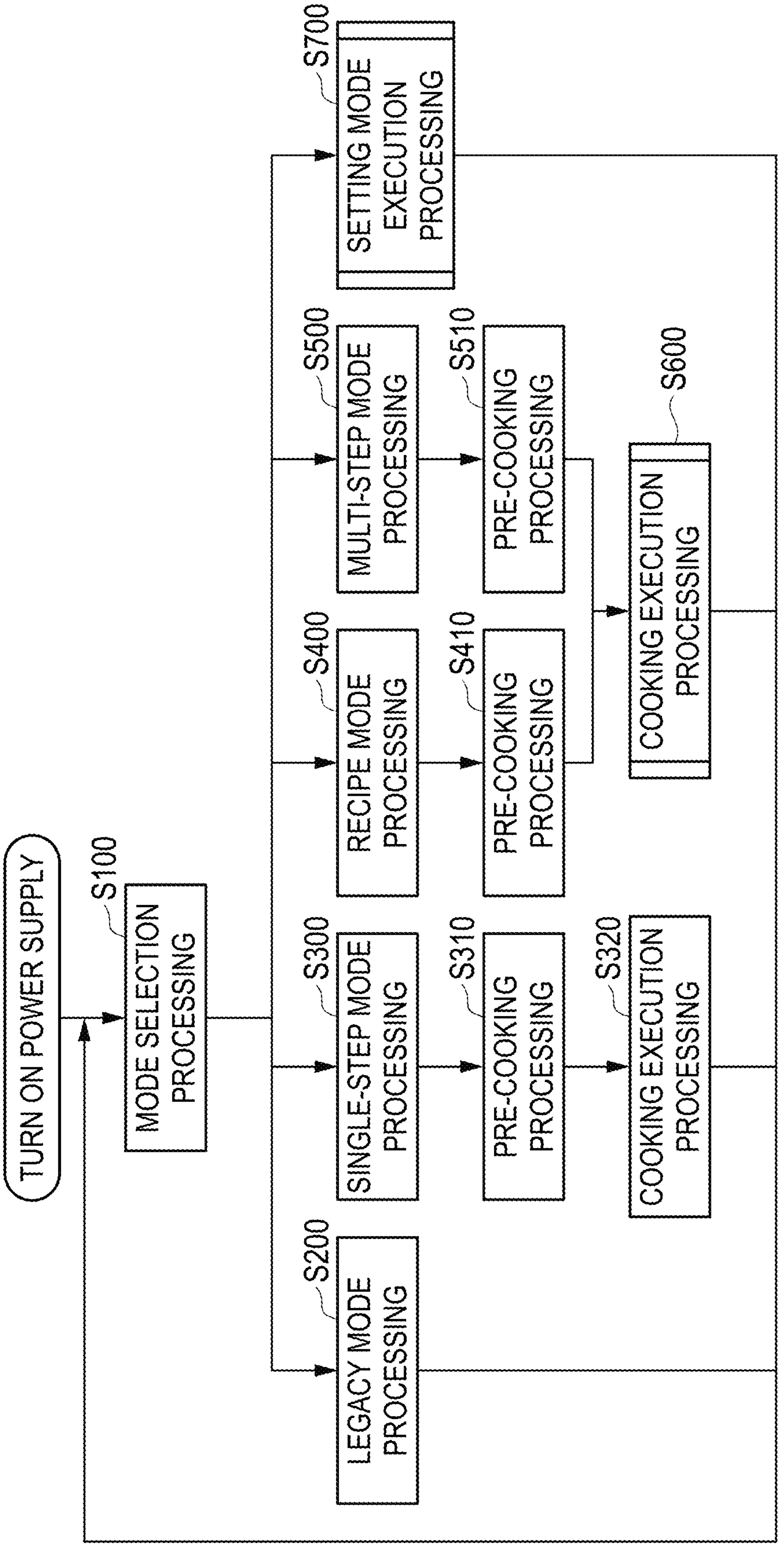
FIG. 6 is a flowchart showing an outline of a basic operation of the cooking system according to the present embodiment.

FIG. 6 is a flowchart showing an outline of a basic operation of the cooking system 1 according to the present embodiment.

As shown in FIG. 6, when the cooking device 10 is powered on, mode selection processing of selecting "cooking mode" or "setting mode" to be executed by the user as the operation mode is executed (S100).

When "legacy mode" in the cooking mode is selected and determined as the operation mode in S100, the control unit 18 executes the legacy mode (S200). In the legacy mode, the user operates the operation display unit 15 to execute thermal power adjustment processing of setting desired thermal power. When the thermal power adjustment processing is executed, the heating unit 11 of the cooking device 10 is controlled to achieve the thermal power set by the control unit 18. Then, when the control unit 18 determines that cooking by the user has ended, the processing returns to S100 again.

When the "single-step mode" in the cooking mode is selected as the operation mode in S100, the control unit 18 executes the single-step mode (S300). When the single-step mode is executed, the control unit 18 executes pre-cooking processing in the single-step mode (S310). In the pre-cooking processing of S310, various parameters necessary for executing single-step execution information are selected and set.

Next, upon receiving an input of cooking execution in a state of waiting for the cooking execution after completion of the pre-cooking processing, the control unit 18 starts cooking execution processing of performing cooking according to the set single-step execution information (S320). In S320, the control unit 18 controls the clock unit 21 and the heating control unit 22 such that the cooking process is executed according to the selected single-step execution information. Then, when the control unit 18 determines that the cooking has ended, the processing returns to S100 again.

When the "recipe mode" in the cooking mode is selected as the operation mode in S100, the control unit 18 executes the recipe mode (S400). When the recipe mode is executed, the control unit 18 executes pre-cooking processing in the recipe mode (S410).

In the pre-cooking processing of S410, various parameters necessary for executing recipe execution information, such as selection and setting of recipe information to be executed and selection of the temperature detection unit 12, are selected and set. Next, upon receiving an input of cooking execution in a state of waiting for the cooking execution after completion of the pre-cooking processing, the control unit 18 starts cooking execution processing of performing cooking according to the set recipe execution information (S600). Details of the cooking execution processing in S600 will be described later with reference to FIG. 7.

When the "multi-step mode" in the cooking mode is selected as the operation mode in S100, the control unit 18 executes the multi-step mode (S500). When the multi-step mode is executed, the control unit 18 executes pre-cooking processing in the multi-step mode (S510).

In the pre-cooking process of S510, various parameters necessary for executing multi-step execution information are selected and set. Next, upon receiving an input of cooking execution in a state of waiting for the cooking execution after completion of the pre-cooking processing, the control unit 18 starts "cooking execution processing" of performing cooking according to the set multi-step execution information (S600). Details of the cooking execution processing in S600 will be described later with reference to FIG. 7.

When the "setting mode" is selected as the operation mode in S100, "setting mode execution processing" of executing various types of setting processing in according to the selected setting mode is started (S700). Details of the setting mode execution processing in S700 will be described later with reference to FIG. 8.

<Cooking Execution Processing>

Figure 7:
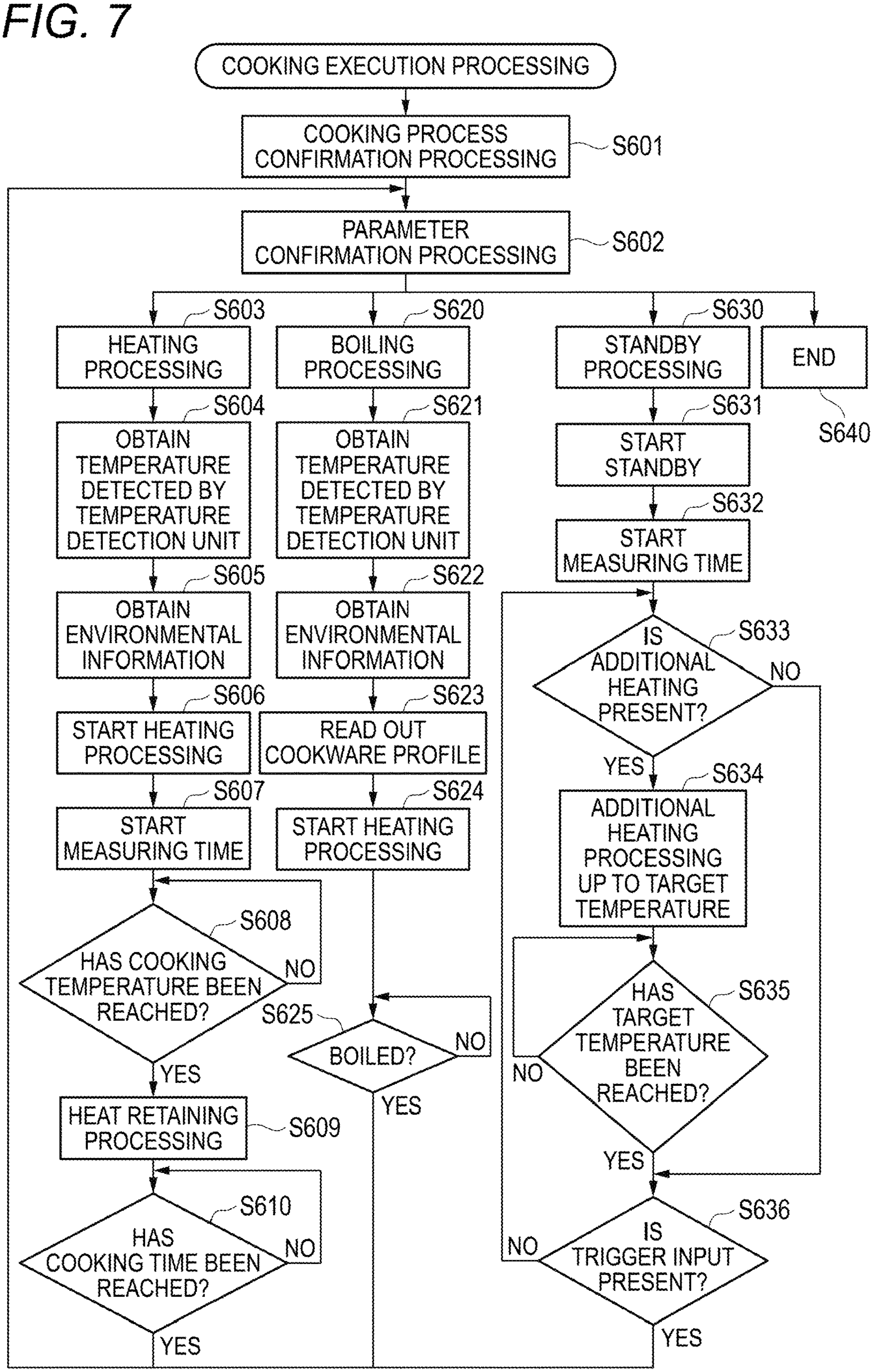
FIG. 7 is a flowchart of cooking execution processing.

FIG. 7 is a flowchart of the cooking execution processing. As shown in FIG. 7, when the cooking execution processing is started, the control unit 18 executes cooking process confirmation processing of confirming cooking processes of cooking execution information to be executed (S601). In the cooking process confirmation processing, the control unit 18 confirms the number of cooking processes set in the cooking execution information to be executed, an order of the cooking processes, and the like. Next, the control unit 18 executes parameter confirmation processing of confirming parameters of the cooking process to be executed (S602). In the parameter confirmation processing, "operation pattern", "temperature target", "cooking temperature", "cooking time", "trigger", "presence or absence of standby processing and standby time", "presence or absence of lid" and the like, which are parameters set in the cooking process to be executed, are confirmed.

In S602, when "heating" is set as an operation pattern of the cooking process to be executed, the control unit 18 proceeds to heating processing (S603). In the heating processing, "heating (low temperature)" or "heating (high temperature)" is set as the operation pattern, but in any case, the following operation is performed.

In executing the heating processing, the control unit 18 obtains temperatures detected by the temperature detection unit 12, that is, a temperature of the outer surface of the bottom portion of the cookware C detected by the body temperature detection unit 12*a* and a temperature of the object to be heated contained in the cookware C (water temperature or oil temperature) detected by the external temperature detection unit 12*b* (S604). The temperature detected by the external temperature detection unit 12*b* in S604 is not obtained in S602 when the cooking process of the cooking execution information to be executed includes a setting parameter of "presence of lid".

Next, the control unit 18 obtains environmental information obtained by the environmental information obtainment unit 13, that is, an outside air temperature detected by the outside air temperature detection unit 13*a* and an atmospheric pressure of the kitchen detected by the atmospheric pressure detection unit 13*b* (S605).

Next, the control unit 18 starts the heating processing of controlling the heating unit 11 in consideration of the environmental information such that a temperature target set in the cooking process matches a set cooking temperature (S606). In S606, when the heating processing is started, the control unit 18 causes the clock unit 21 to start measuring cooking time (S607).

Next, the control unit 18 determines whether a temperature of the temperature target has reached the set cooking temperature (S608). In S608, when the control unit 18 determines that the temperature of the temperature target has reached the cooking temperature (S608: Yes), the control unit 18 executes heat retaining processing of controlling the heating unit 11 such that a current temperature is maintained (S609).

On the other hand, when the control unit 18 determines that the temperature of the temperature target has not reached the cooking temperature (S608: Not, the control unit 18 continues the heating processing being executed. In S608 and S609, the control unit 18 controls the temperature of the temperature target while sequentially monitoring a temperature value of at least one of the body temperature detection unit 12*a* and the external temperature detection unit 12*b*.

Next, the control unit 18 determines whether the cooking time of the cooking process being executed has been reached (S610). In S610, when the control unit 18 determines that the cooking process being executed has reached the set cooking time (S610: Yes), the processing returns to S602 to proceed to the next cooking process.

On the other hand, when the control unit 18 determines that the cooking process being executed has not reached the set cooking time (S610: No), the control unit 18 continues the heat retaining processing.

In S602, when "boiling" is set as the operation pattern of the cooking process to be executed, the control unit 18 proceeds to boiling processing (S620).

In executing the boiling processing, the control unit 18 obtains temperatures detected by the temperature detection unit 12, that is, a temperature of the outer surface of the bottom portion of the cookware C detected by the body temperature detection unit 12*a* and a temperature of the object to be heated contained in the cookware C (water temperature or oil temperature) detected by the external temperature detection unit 12*b* (S621). The temperature detected by the external temperature detection unit 12*b* in S621 is not obtained in S602 when the cooking process of the cooking execution information to be executed includes the setting parameter of "presence of lid".

Next, the control unit 18 obtains environmental information obtained by the environmental information obtainment unit 13, that is, an outside air temperature detected by the outside air temperature detection unit 13*a* and an atmospheric pressure of the kitchen detected by the atmospheric pressure detection unit 13*b* (S622).

Next, the control unit 18 reads out a cookware profile of the cookware C to be used from the storage unit 17 (S623), and starts heating processing of controlling the heating unit 11 to obtain appropriate thermal power by using the cookware profile in consideration of the environmental information (S624). When heating execution processing is started, the control unit 18 determines whether water in the cookware C has boiled (S625).

In S625, when the control unit 18 determines that the water in the cookware C has boiled (S625: Yes), the processing returns to S602 to proceed to the next cooking process.

On the other hand, when the control unit 18 determines that the water in the cookware C has not boiled (S625: No), the control unit 18 continues the heating processing being performed. In S625, the control unit 18 determines whether boiling has occurred by sequentially monitoring a temperature value of at least one of the body temperature detection unit 12*a* and the external temperature detection unit 12*b*.

In S602, when "standby" is set as the operation pattern of the cooking process to be executed, the control unit 18 proceeds to standby processing (S630).

In executing the standby processing, when the control unit 18 starts the standby processing (S631), the control unit 18 causes the clock unit 21 to start measuring standby time (S632). Next, the control unit 18 determines whether additional heating is set in the cooking process (S633).

In S633, when the control unit 18 determines that the additional heating is set (S633: Yes), the control unit 18 executes additional heating processing by controlling the heating unit 11 so as to achieve a set target temperature (S634). Then, the control unit 18 determines whether the temperature target has reached the target temperature by the additional heating processing (S635).

On the other hand, when it is determined that the additional heating is not set (S633: No), it is determined whether a trigger input for canceling a standby state is present (S636).

In S635, when the control unit 18 determines that the temperature target has reached the target temperature (S635: Yes), the processing proceeds to S636.

In the other hand, when the control unit 18 determines that the temperature target has not reached the target temperature (S635: No), the control unit 18 continues the heating processing being executed.

In S636, when the control unit 18 determines that a set trigger input is present (S635: Yes), the processing returns to S602 to proceed to the next cooking processing.

On the other hand, when the control unit 18 determines that no set trigger input is present (S636: No), the processing returns to S633 again. In S636, the control unit 18 determines whether a time measurement end signal indicating that set standby time has elapsed or an operation signal of a predetermined operation button (for example, a skip button) is input as the trigger input.

The processing of S632 may be executed when an input of the time measurement end signal after elapse of the standby time is set as a trigger, and thus, when "operation of operation button" is set as a trigger of standby release during the standby processing, the processing may pass through this processing.

When "end" is set as the operation pattern of the cooking process to be executed in S602, the control unit 18 ends the processing of the executed cooking execution information (S640). In S640, an end of the processing of the cooking execution information means that a series of cooking processes set in the cooking execution information have ended and the cooking has been completed.

In the cooking execution processing described above, when the temperature detection unit 12 includes only the body temperature detection unit 12*a*, the temperature of the temperature target is predicted by correcting the measured temperature value by the body temperature detection unit 12*a* using the cookware profile to be used, and the heating unit 11 is controlled such that the predicted temperature matches the set cooking temperature. This control is performed in the heating processing (processing of S606 to S610), the boiling processing (processing of S624 and S625), and the standby processing (processing of S633 to S635) described above.

<Setting Mode Execution Processing>

Figure 8:
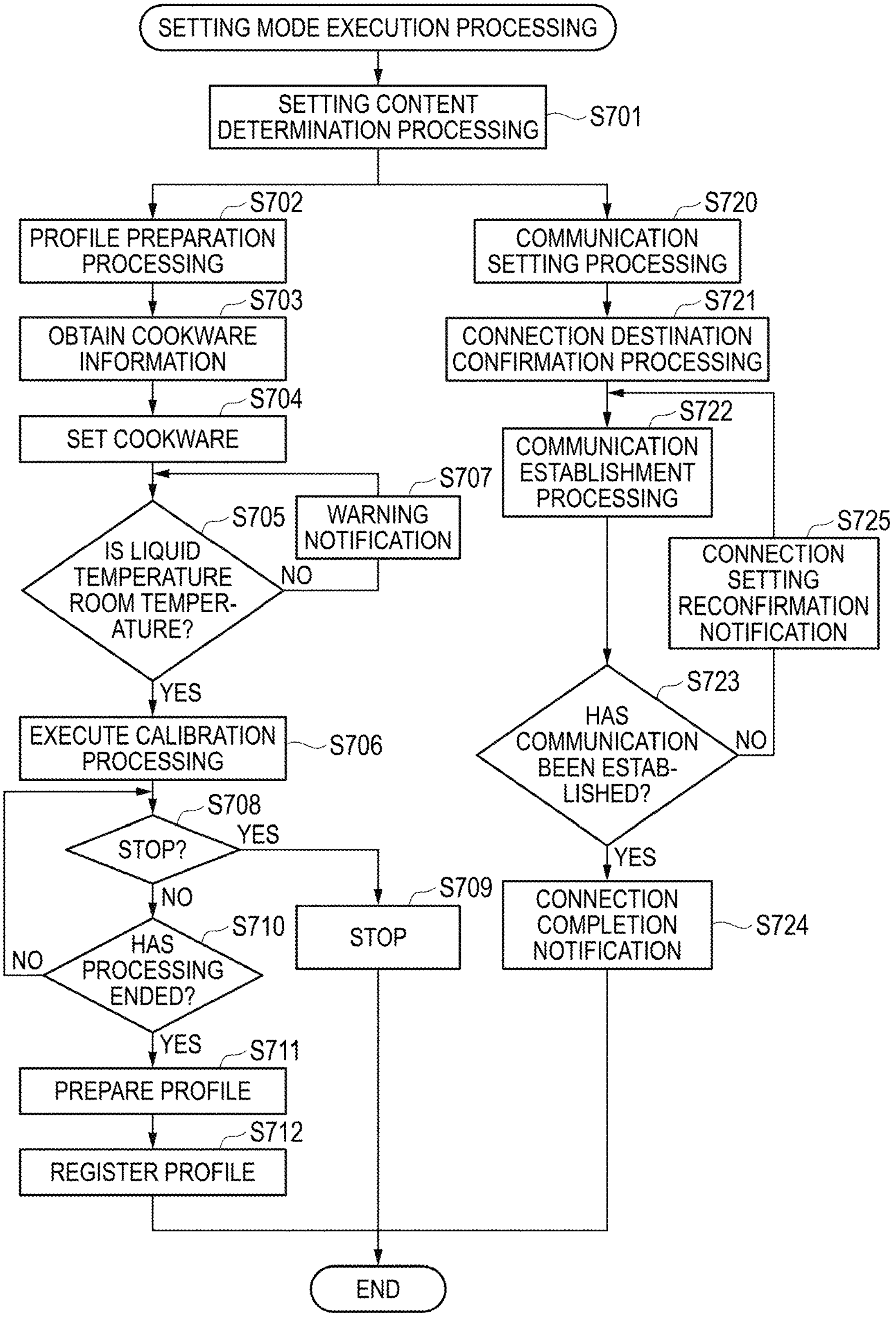
FIG. 8 is a flowchart of setting mode execution processing.

FIG. 8 is a flowchart of the selling mode execution processing. In a processing flow shown in FIG. 8, "profile preparation processing" and "communication setting processing" are described as the setting mode execution processing, but in addition to these, "profile management processing" and the "device information setting processing" may be included.

As shown in FIG. 8, when the setting mode execution processing is started, the control unit 18 executes determination processing of a content of selected setting processing (S701). In S701, the control unit 18 determines whether the content of the setting processing is "profile preparation processing" or "communication setting processing".

When the setting processing to be executed is the "profile preparation processing" in S701, the control unit 18 proceeds to the profile preparation processing (S702).

In executing the profile preparation processing, the control unit 18 obtains cookware information of the cookware C to be used (S703). The cookware information includes a name of the cookware C and specification information of the cookware C.

Next, when the cookware C containing a predetermined amount of object to be heated is set in the cooking device 10 (S704), the control unit 18 determines whether a temperature of the object to be heated in the set cookware C is a room temperature (S705).

In S705, when the control unit 18 determines that the temperature of the object to be heated in the cookware C is the room temperature (S705: Yes), the control unit 18 executes calibration processing (S706).

On the other hand, when the control unit 18 determines that the temperature of the object to be heated in the cookware C is not the normal temperature (S705: No), the control unit 18 outputs a warning notification to the user (S707), and the processing returns to S705 again.

In S706, the control unit 18 sequentially monitors temperature values by the body temperature detection unit 12*a* and the external temperature detection unit 12*b*, and executes the calibration processing while obtaining a temperature difference between the temperature values for each elapsed time.

Next, it is determined whether a stop instruction is input during execution of the calibration processing (S708). In S708, when the control unit 18 determines that the stop instruction is input (S708: Yes), the control unit 18 stops the calibration processing (S709) and ends the processing.

On the other hand, when the control unit 18 determines that the stop instruction is not input (S708: No), the control unit 18 determines whether a series of set calibration processing has ended (S710).

In S710, when the control unit 18 determines that the set calibration processing has ended (S710: Yes), the control unit 18 prepares a cookware profile of the target cookware C (S711), executes registration processing of the cookware profile (S712), and ends the processing.

On the other hand, when the control unit 18 determines that the set calibration processing has not ended (S711: No), the control unit 18 continues the calibration processing being executed.

When the setting processing to be executed is the "communication setting processing" in S701, the control unit 18 proceeds to the communication setting processing (S720). In the communication setting processing, the mobile terminal 100 serving as a connection destination is the mobile terminal 100 on which user registration processing has been performed in advance.

In executing the communication setting processing, the control unit 18 executes processing of confirming the connection destination (the mobile terminal 100 or the external temperature detection unit 12*b*) of the cooking device 10 (S721). Next, the control unit 18 executes communication establishment processing of establishing communication between the cooking device 10 and the connection destination (S722). In S722, the control unit 18 executes, as the communication establishment processing, processing of establishing communication between the cooking device 10 and the external temperature detection unit 12*b* or the mobile terminal 100 as a connection destination according to a communication method therebetween.

Next, the control unit 18 determines whether the communication between the cooking device 10 and the connection destination has been established by the communication establishment processing (S723), in S723, when the control unit 18 determines that the communication between the cooking device 10 and the connection destination has been established (S723: Yes), the control unit 18 outputs a connection completion notification (S724), and ends the processing.

On the other hand, when the control unit 18 determines that the communication between the cooking device 10 and the connection destination has not been established (S723: No), the control unit 18 outputs a notification for prompting reconfirmation of connection setting (S725), and the processing returns to S722 again.

[Operational Effects]

As described above, in the cooking system 1 according to the present embodiment, the cooking device 10 includes the heating unit 11 that heats the cookware C containing the object to be heated such as water, oil and ingredients, the temperature detection unit 12 that detects at least one of the temperature of the object to be heated and the temperature of the outer surface of the bottom portion of the cookware C, and the control unit 18 that controls the heating unit 11 based on the temperature detected by the temperature detection unit 12 such that the temperature of the object to be heated in the cookware C or the surface temperature of the inner surface of the bottom portion of the cookware C matches the cooking temperature set in the cooking process included in the cooking execution information.

When cooking is performed by executing the cooking execution information, the cooking device 10 according to the present embodiment can perform cooking by controlling the temperature of the object to be heated in the cookware C with high accuracy, instead of cooking by the thermal power as in the related-art device. Therefore, the user can easily cook a dish according to the cooking execution information, for example, a dish based on a cooking recipe provided by a professional cook, without adjusting and controlling the thermal power by the user himself or herself for fine temperature control that is important in cooking.

In the cooking device 10, the temperature detection unit 12 is configured to include at least one of the body temperature detection unit 12*a* that detects the temperature of the outer surface of the bottom portion of the cookware C serving as the temperature detection target and the external temperature detection unit 12*b* that directly detects the temperature of the object to be heated contained in the cookware C serving as the temperature detection target.

Therefore, the temperature of the object to be heated in the cookware C can be detected using the external temperature detection unit 12*b* in the normal cooking process, and the temperature of the object to be heated in the cookware C can be obtained based on the temperature detected by the body temperature detection unit 12*a* in the cooking process requiring the lid, and the temperature of the object to be heated in the cookware C can be controlled with high accuracy.

In the cooking device 10, the control unit 18 includes the cooking execution unit 20 that executes the cooking process according to the cooking procedure set in advance while controlling the heating unit 11 such that the temperature of the object to be heated in the cookware C set as the temperature control target or the surface temperature of the inner surface of the bottom portion of the cookware C matches the set cooking temperature, and the profile preparation unit 24 that prepares the cookware profile for predicting the temperature of the object to be heated by correcting the temperature of the outer surface of the bottom portion of the cookware C detected by the body temperature detection unit 12*a* according to the specifications of the cookware C, the cookware profile including the time-lapse temperature difference information indicating the dynamic relationship of the temperature difference for each elapsed time between the temperature of the outer surface of the bottom portion of the cookware C detected by the body temperature detection unit 12*a* and the temperature of the object to be heated detected by the external temperature detection unit 12*b* when the cookware C is heated in a state where the object to be heated is contained in the cookware C. The cooking execution unit 20 predicts the temperature of the temperature control target by correcting the temperature of the outer surface of the bottom portion of the cookware C detected by the body temperature detection unit 12*a* using the cookware profile of the cookware C in use, and controls the heating unit 11 such that the predicted temperature (the predicted temperature of the temperature control target) matches the cooking temperature.

Thereby, when the temperature (the temperature of the object to be heated or the surface temperature of the inner surface of the bottom portion of the cookware C) of the temperature control target (the temperature target) is predicted based on the temperature of the outer surface of the bottom portion of the cookware C detected by the body temperature detection unit 12*a*, the temperature inside the cookware C can be predicted by correcting the temperature detected by the body temperature detection unit 12*a* using the cookware profile corresponding to the cookware C to be used, so that the control unit 18 can control the temperature of the temperature target with high accuracy.

The cooking device 10 includes the environmental information obtainment unit 13 that obtains the outside air temperature and the atmospheric pressure as the environmental information of the kitchen, the environmental information obtainment unit 13 including the outside air temperature detection unit 13*a* that detects the outside air temperature of the kitchen and the atmospheric pressure detection unit 13*b* that detects the atmospheric pressure of the kitchen. The control unit 18 controls an output of the heating unit 11 in the cooking process in consideration of the obtained environmental information when the cooking execution information is executed.

Thereby, when the cooking device 10 executes the cooking process according to the cooking execution information, the output of the heating unit 11 can be finely adjusted according to the environment of the kitchen, so that the object to be heated in the cookware C and the heating output of the heating unit 11 can be controlled with high accuracy.

The cooking system 1 is a system configured such that the cooking device 10 and the mobile terminal 100 registered as the owner of the cooking device 10 are connected to each other so as to enable bidirectional communication. The mobile terminal 100 includes the terminal control unit 103 that outputs the initialization execution instruction for causing the cooking device 10 to execute the initialization processing. The cooking device 10 executes the initialization processing by the control unit 18 only when the initialization execution instruction is received from the mobile terminal 100.

Thereby, since the cooking device 10 receives only the initialization execution instruction from the mobile terminal 100 registered by the owner and executes the initialization processing, unintended initialization processing can be prevented from being executed by another person.

[Others]

In the above-described embodiment, the cooking system 1 corresponds to an example of a "cooking system" described in the claims. The cooking device 10 corresponds to an example of a "cooking device" described in the claims. The heating unit 11 corresponds to an example of a "heating unit" described in the claims. The temperature detection unit 12 corresponds to an example of a "temperature detection unit" described in the claims. The body temperature detection unit 12*a* corresponds to an example of a "body temperature detection unit" described in the claims. The external temperature detection unit 12*b* corresponds to an example of an "external temperature detection unit" described in the claims. The environmental information obtainment unit 13 corresponds to an example of an "environmental information obtainment unit" described in the claims. The outside air temperature detection unit 13*a* corresponds to an example of an "outside air temperature detection unit" described in the claims. The atmospheric pressure detection unit 13*b* corresponds to an example of an "atmospheric pressure detection unit" described in the claims. The control unit 18 corresponds to an example of a "control unit" described in the claims. The cooking execution unit 20 corresponds to an example of a "cooking execution unit" described in the claims. The profile preparation unit 24 corresponds to an example of a "profile preparation unit" described in the claims. The mobile terminal 100 corresponds to an example of a "mobile terminal" described in the claims. The terminal control unit 103 corresponds to an example of a "terminal control unit" described in the claims. The cookware C corresponds to an example of a "cookware" described in the claims.

The terms used in the above-described embodiment and the claims should be interpreted as non-limiting terms. For example, the term "include" should be interpreted as "not limited to what is described as include". The term "comprise" should be interpreted as "not limited to what is described as comprise". The term "have" should be interpreted as "not limited to what is described as have".

REFERENCE SIGNS LIST

- 1 cooking system
- 10 cooking device (10*a* body, 10*b* top plate)
- 11 heating unit
- 12 temperature detection unit (12*a* body temperature detection unit, 12*b* external temperature detection unit)
- 13 environmental information obtainment unit (13*a* outside air temperature detection unit, 13*b* atmospheric pressure detection unit)
- 14 weight detection unit
- 15 operation display unit (15*a* display area, 15*b* operation area, 15*c* operation button)
- 16 communication unit
- 17 storage unit
- 18 control unit
- 19 input reception unit
- 20 cooking execution unit
- 21 clock unit
- 22 heating control unit
- 23 cooking execution information preparation unit
- 24 profile preparation unit

25 preset management unit
26 communication setting unit
27 device information setting unit
28 display control unit
100 mobile terminal
101 terminal communication unit
102 terminal storage unit
103 terminal control unit (103a terminal-side cooking execution unit, 103b terminal-side clock unit, 103c terminal-side cooking execution information preparation unit, 103d terminal-side profile preparation unit, 103e terminal-side preset management unit, 103f terminal-side device information setting unit)
104 terminal display unit
105 terminal operation unit
C cookware

The invention claimed is:

1. A cooking device comprising:
a heater configured to heat cookware containing an object to be heated;
a temperature detector including:
a body temperature detector configured to detect a temperature of an outer surface of a bottom portion of the cookware serving as a temperature detection target; and
an external temperature detector configured to directly detect a temperature of the object to be heated contained in the cookware serving as a temperature detection target, the temperature detector being configured to detect at least one of the temperature of the object to be heated and the temperature of the outer surface of the bottom portion of the cookware; and
a controller configured to control the heater based on the temperature detected by the temperature detector such that a temperature of the object to be heated in the cookware or a surface temperature of an inner surface of the bottom portion of the cookware matches a cooking temperature set in a cooking process included in cooking execution information,
wherein the controller is programmed to:
determine time-lapse temperature difference information by temporally observing and recording the temperature difference between the temperature of the outer surface of the bottom portion of the cookware detected by the body temperature detector and the temperature of the object to be heated detected by the external temperature detector;
prepare a cookware profile for predicting the temperature of the object to be heated by correcting the temperature of the outer surface of the bottom portion of the cookware detected by the body temperature detector according to the cookware, the cookware profile including the time-lapse temperature difference information indicating a dynamic relationship of a temperature difference for each elapsed time between the temperature of the outer surface of the bottom portion of the cookware detected by the body temperature detector and the temperature of the object to be heated detected by the external temperature detector when the cookware is heated in a state where the object to be heated is contained in the cookware;
execute the cooking process according to a cooking procedure set in advance while controlling the heater such that the temperature of the object to be heated in the cookware set as a temperature control target or the surface temperature of the inner surface of the bottom portion of the cookware matches the cooking temperature;
correct the temperature of the outer surface of the bottom portion detected by the body temperature detector;
predict the temperature of the temperature control target, based on the corrected temperature of the outer surface of the bottom portion, by using the cookware profile of the cookware in use; and
control the heater such that the predicted temperature matches the cooking temperature.

2. The cooking device according to claim 1, further comprising:
an outside air temperature detector configured to detect an outside air temperature of a kitchen; and
an atmospheric pressure detector configured to detect an atmospheric pressure of the kitchen, the outside air temperature detector and the atmospheric pressure detector being configured to obtain the outside air temperature and the atmospheric pressure as environmental information of the kitchen,
wherein the controller is configured to control an output of the heater in the cooking process in consideration of the obtained environmental information when the cooking execution information is executed.

3. A cooking system comprising:
a cooking device including:
a heater configured to heat cookware containing an object to be heated;
a temperature detector configured to detect at least one of a temperature of the object to be heated and a temperature of an outer surface of a bottom portion of the cookware;
a storage device configured to store a profile database in which cookware profiles for each cookware are organized, the cookware profiles being applied to predict a temperature of the object by correcting the temperature of the outer surface of the bottom portion of the cookware detected by the temperature detector; and
a controller configured to control the heater based on the temperature detected by the temperature detector such that a temperature of the object to be heated in the cookware or a surface temperature of an inner surface of the bottom portion of the cookware matches a cooking temperature set in a cooking process included in cooking execution information; and
a mobile terminal registered as an owner of the cooking device, the cooking device and the mobile terminal being connected to each other so as to enable bidirectional communication,
wherein the mobile terminal includes a terminal controller configured to output an initialization execution instruction for causing the cooking device to execute initialization processing,
wherein the cooking device executes the initialization processing by the controller only when the initialization execution instruction is received from the mobile terminal,
wherein the cookware profiles contained in the profile database include time-lapse temperature difference information indicating a dynamic relationship of a temperature difference for each elapsed time between the temperature of the outer surface of the bottom portion of the cookware and the temperature of the object to be heated, and wherein the cookware profiles are determined by temporally observing and recording the temperature difference between the temperature of the outer surface of the bottom portion of the cookware detected by the temperature detector and the temperature of the object to be heated.

4. A cooking device comprising:

a heater configured to heat a cookware containing an object to be heated;

a body temperature detector configured to detect a temperature of an outer surface of a bottom portion of the cookware serving as a temperature detection target;

a controller configured to control the heater based on the temperature detected by the body temperature detector such that a temperature of the object to be heated in the cookware or a surface temperature of an inner surface of the bottom portion of the cookware matches a cooking temperature set in a cooking process included in cooking execution information; and a storage device configured to store a profile database in which cookware profiles for each cookware are organized, the cookware profiles being applied to predict a temperature of the object by correcting the temperature of the outer surface of the bottom portion of the cookware detected by the body temperature detector, wherein the controller is configured to:

execute the cooking process according to a cooking procedure set in advance while controlling the heater such that the temperature of the object to be heated in the cookware sets as a temperature control target or the surface temperature of the inner surface of the bottom portion of the cookware matches the cooking temperature;

correct the temperature of the outer surface of the bottom portion detected by the body temperature detector to predict the temperature of the temperature control target by referring the profile database and using a particular cookware profile organized for the cookware in use; and control the heater such that the predicted temperature matches the cooking temperature, wherein the cookware profiles contained in the profile database include time-lapse temperature difference information indicating a dynamic relationship of a temperature difference for each elapsed time between the temperature of the outer surface of the bottom portion of the cookware and the temperature of the object to be heated, and wherein the cookware profiles are determined by temporally observing and recording the temperature difference between the temperature of the outer surface of the bottom portion of the cookware detected by the temperature detector and the temperature of the object to be heated.

* * * * *